(12) United States Patent
Forsman et al.

(10) Patent No.: US 11,032,393 B2
(45) Date of Patent: Jun. 8, 2021

(54) NETWORK NODE AND METHOD PERFORMED THEREBY PROVIDING A RECOMMENDATION ASSOCIATED WITH A SERVICE TO A WIRELESS DEVICE

(71) Applicant: Telefonaktiebolaget LM Ericsson (publ), Stockholm (SE)

(72) Inventors: Mats Forsman, Rönninge (SE); Ann-Christine Eriksson, Enköping (SE); Tomas Nylander, Värmdö (SE); Tomas Thyni, Järfälla (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 16/485,699

(22) PCT Filed: Mar. 21, 2017

(86) PCT No.: PCT/SE2017/050269
§ 371 (c)(1),
(2) Date: Aug. 13, 2019

(87) PCT Pub. No.: WO2018/174756
PCT Pub. Date: Sep. 27, 2018

(65) Prior Publication Data
US 2020/0059537 A1    Feb. 20, 2020

(51) Int. Cl.
*H04L 29/08* (2006.01)
*H04L 29/06* (2006.01)

(52) U.S. Cl.
CPC ...... *H04L 67/322* (2013.01); *H04L 29/08954* (2013.01); *H04L 65/4084* (2013.01); *H04L 65/80* (2013.01)

(58) Field of Classification Search
CPC . H04L 5/0064; H04L 12/40065; H04L 29/06; H04L 29/06326; H04L 29/08;
(Continued)

(56) References Cited

U.S. PATENT DOCUMENTS 8,174,970 B2 * 5/2012 Adamczyk .......... H04L 47/2408
370/230
8,918,514 B2 * 12/2014 Anschutz ............ H04L 41/0896
709/226
(Continued)

FOREIGN PATENT DOCUMENTS

EP            2615777 A1    7/2013
WO     2014134309 A1    9/2014
(Continued)

OTHER PUBLICATIONS

International Search Report and Written Opinion dated Aug. 2, 2017 for International Application No. PCT/SE2017/050269 filed on Mar. 21, 2017, consisting of 9-pages.

*Primary Examiner* — Tri H Phan
(74) *Attorney, Agent, or Firm* — Christopher & Weisberg, P.A.

(57) ABSTRACT

A network node and a method performed by a network node for providing a recommendation associated with a service to a wireless device are provided. The network node is operable in a wireless communication network. The method includes obtaining bandwidth information associated with a radio interface between a radio access node of a Radio Access Network, RAN, of the wireless communication network and the wireless device; and obtaining bandwidth information associated with a transport network of the wireless communication network. The method further includes determining available bandwidth for providing the service to the wireless device based on the obtained bandwidth information associated with the radio interface and the obtained bandwidth information associated with the transport network.

18 Claims, 19 Drawing Sheets

(58) Field of Classification Search
CPC ......... H04L 29/08576; H04L 29/08954; H04L 41/00; H04L 41/0896; H04L 41/50; H04L 41/5077; H04L 47/10; H04L 47/24; H04L 47/528; H04L 47/783; H04L 47/787; H04L 65/80; H04L 65/4084; H04L 67/04; H04L 67/322; H04L 67/2828; H04L 2012/5626; H04L 2012/5631; H04L 2012/5632; H04L 2012/6456

See application file for complete search history.

(56) References Cited

U.S. PATENT DOCUMENTS

| | | | |
|---|---|---|---|
| 9,374,289 B2 * | 6/2016 | Kotecha | H04W 28/0284 |
| 9,432,874 B2 * | 8/2016 | Racz | H04W 28/0268 |
| 9,686,696 B2 * | 6/2017 | Thyni | H04W 52/143 |
| 9,936,406 B2 * | 4/2018 | Andersson | H04W 24/08 |
| 10,194,342 B2 * | 1/2019 | Welin | H04W 28/0284 |
| 10,200,883 B2 * | 2/2019 | Bedekar | H04W 24/02 |
| 10,412,609 B2 * | 9/2019 | Andersson | H04L 41/12 |
| 2014/0280679 A1 | 9/2014 | Dey et al. | |

FOREIGN PATENT DOCUMENTS

| | | |
|---|---|---|
| WO | 2015050481 A1 | 4/2015 |
| WO | 2015050482 A1 | 4/2015 |
| WO | 2015122817 A1 | 8/2015 |
| WO | 2015124210 A1 | 8/2015 |

\* cited by examiner

— ·· — ·· — Radio interface

— — — — — Protocol interface

NETWORK NODE AND METHOD PERFORMED THEREBY PROVIDING A RECOMMENDATION ASSOCIATED WITH A SERVICE TO A WIRELESS DEVICE

CROSS-REFERENCE TO RELATED APPLICATIONS

This application is a Submission Under 35 U.S.C. § 371 for U.S. National Stage Patent Application of International Application Number: PCT/SE2017/050269, filed Mar. 21, 2017 entitled "A NETWORK NODE AND A METHOD PERFORMED THEREBY FOR PROVIDING A RECOMMENDATION ASSOCIATED WITH A SERVICE TO A WIRELESS DEVICE," the entirety of which is incorporated herein by reference.

TECHNICAL FIELD

The present disclosure relates to wireless communication and in particular to a network node and a method performed by a network node for providing a recommendation associated with a service to a wireless device.

BACKGROUND

Wireless communication and wireless communication networks are constantly evolving and more and more different services are being offered to users of wireless devices. Many services are becoming increasingly advanced and many services require a large amount of data transfer in order to execute the service. The requirements on e.g. the Quality of Experience, QoE, associated with the service are becoming higher and higher.

A user of a wireless device generally expects the service to be carried out without interruptions and with high quality. Merely as a couple of examples, a user expects a voice call to be clear meaning having good audio qualities, a video call to be good so that the user may see and hear the other person clearly without interruptions or periods of freezing, meaning that the video stream stops while the voice part of the video call may still be ongoing. Another example is playout of a video on the screen of a wireless device or the screen of a device connected to the wireless device. One reason for unacceptable QoE may be that the service is being delivered with a bitrate that is higher than the available throughput. The throughput in the network may vary substantially over time.

End user experience, e.g. QoE, is a key differentiator for mobile operators and internet service providers. Applications may attempt to be adaptive to ensure a good QoE, e.g. adapt to varying throughput by changing the resolution of a video to avoid freezing of the video. This may be done by the application trying to estimate the throughput between an application server and the client in the wireless device—, e.g. based on measured link bit rate or round-trip times. However, this estimation is done on historic data, i.e. from when the application in the client wireless device last fetched a video segment, meaning that the estimation can be 'old' (e.g. 5-10 seconds old) and thus inaccurate.

SUMMARY

The object is to obviate at least some of the problems outlined above. In particular, it is an object to provide a network node and a method performed by a network node for providing a recommendation associated with a service to a wireless device. These objects and others may be obtained by providing a network node and a method performed by a network node according to the independent claims attached below.

According to an aspect, a method performed by a network node for providing a recommendation associated with a service to a wireless device is provided. The network node is operable in a wireless communication network. The method comprises obtaining bandwidth information associated with a radio interface between a radio access node of a Radio Access Network, RAN, of the wireless communication network and the wireless device; and obtaining bandwidth information associated with a transport network of the wireless communication network. The method further comprises determining available bandwidth for providing the service to the wireless device based on the obtained bandwidth information associated with the radio interface and the obtained bandwidth information associated with the transport network.

According to an aspect, a network node for providing a recommendation associated with a service to a wireless device is provided. The network node is operable in a wireless communication network. The network node is configured for obtaining bandwidth information associated with a radio interface between a radio access node of a Radio Access Network, RAN, of the wireless communication network and the wireless device; and obtaining bandwidth information associated with a transport network of the wireless communication network. The network node is further configured for determining available bandwidth for providing the service to the wireless device based on the obtained bandwidth information associated with the radio interface and the obtained bandwidth information associated with the transport network.

The network node and the method performed by the network node have several advantages. One possible advantage is that it may improve the end user Quality of Experience, QoE, by facilitating that for example a suitable media bit rate is used for video segments by using information about conditions in the radio interface as well as the transport network. In some embodiments, the solution also makes it possible to provide a suitable bandwidth recommendation associated with a service to the wireless device when the wireless device is served by multiple radio access node sites using carrier aggregation, CA, or dual connectivity, DC, by combining bandwidth information for the multiple radio interfaces and transport networks associated with the provision of the service to the wireless device. Furthermore, the interaction is between the wireless device and the wireless communication network via the radio access node, without involving/impacting the application service provider. There is thus only a relation between a subscriber's wireless device and the wireless communication network. There is no relation needed between the application service provider and the operator of the wireless communication network, which may be a big advantage since the number of application service providers compared to mobile operators is large.

BRIEF DESCRIPTION OF DRAWINGS

Embodiments will now be described in more detail in relation to the accompanying drawings, in which:

FIG. 3l is a signalling diagram of an exemplifying embodiment of providing a recommendation to a wireless device, WD, for dual connectivity being anchored at a core site, passing multiple Packet Processing Functions, CUs.

DETAILED DESCRIPTION

Briefly described, a network node and a method performed by a network node for providing a recommendation associated with a service to a wireless device are provided. The network node obtains bandwidth information associated with the communication path between a wireless device and either an application server comprised in the wireless communication network or a gateway in the wireless communication network towards another communication network. The obtained information may then be used to determine e.g. what bandwidth to recommend to the wireless device. It is pointed out that bandwidth and bitrate are strongly correlated, the bitrate is dependent on the bandwidth. Consequently, in this disclosure the term bandwidth is used but it may be replaced with bitrate.

Figure 1A:
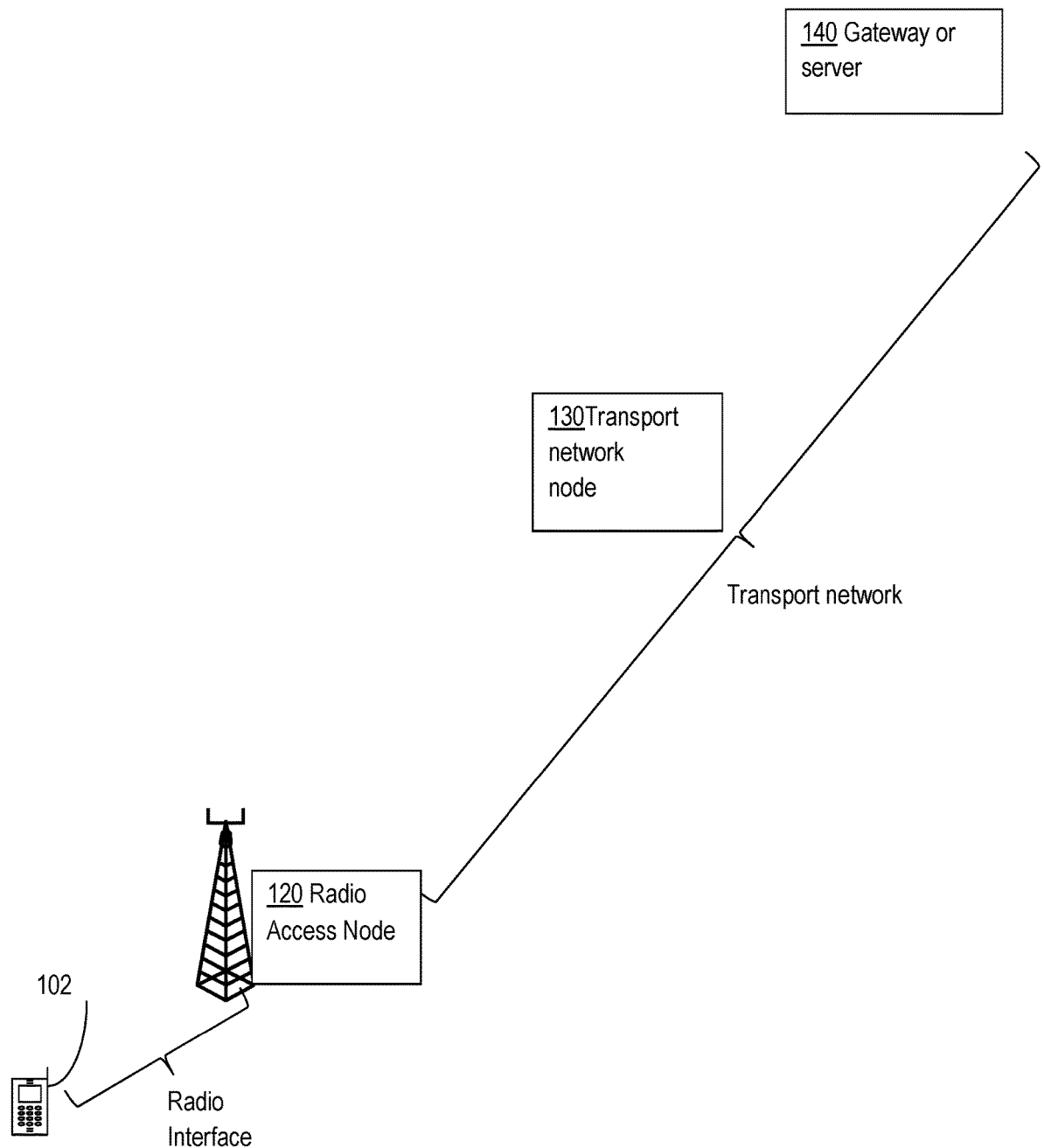
FIG. 1a is an illustration of a communication path between a wireless device and an application server or gateway.

FIG. 1a is an illustration of a communication path between a wireless device and an application server or a gateway in the wireless communication network. In this figure, the communication path between a wireless device and an application server or gateway is divided into two parts, a radio interface between the wireless device 102 and a radio access node 120, and a transport network between the radio access node 120 and the application server or gateway 140. The transport network may comprise one or more intermediate nodes, also referred to transport network node(s) 130. In this figure, the radio access node is comprised in, or is, a radio base station, e.g. an evolved Node B, eNB.

Figure 1B:
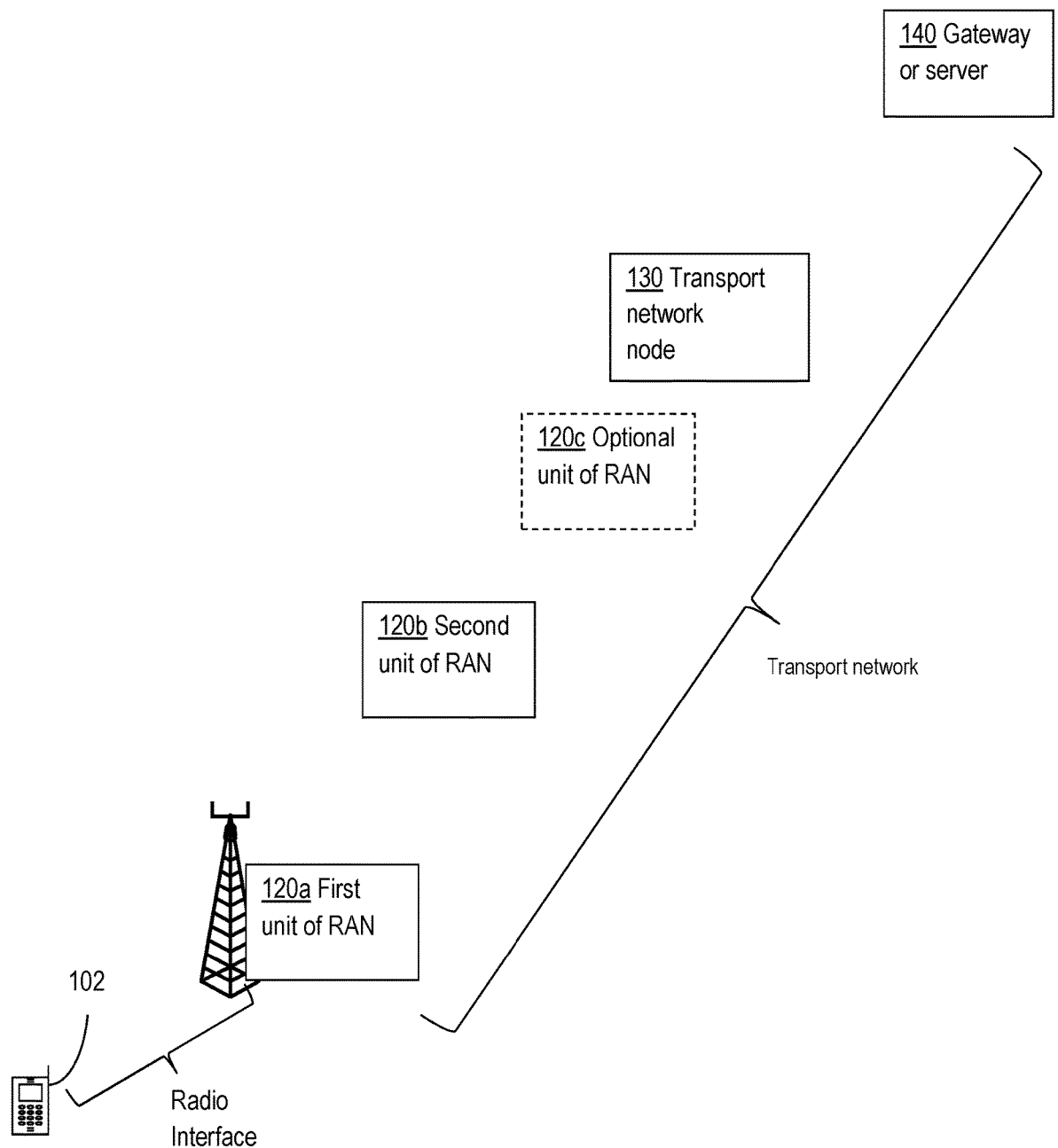
FIG. 1b is another illustration of a communication path between a wireless device and an application server or gateway.

FIG. 1b is another illustration of a communication path between a wireless device and an application server or a gateway in the wireless communication network. In this figure, the radio base station is split into two or more units 120a, 120b, 120c, which units may be comprised in, or comprise, separate nodes of the RAN. Also in FIG. 1b, the communication path between a wireless device 102 and an application server or gateway 140 is divided into two parts, a radio interface between the wireless device 102 and a radio access node 120a (also referred to as a first unit of RAN in this example), and a transport network between the radio access node 120a (first unit of RAN) and the application server or gateway 140, wherein traffic between the first unit of RAN 120a and the gateway or application server 140 passes through, or is communicated via, at least a second unit of RAN 120b.

Figure 2A:
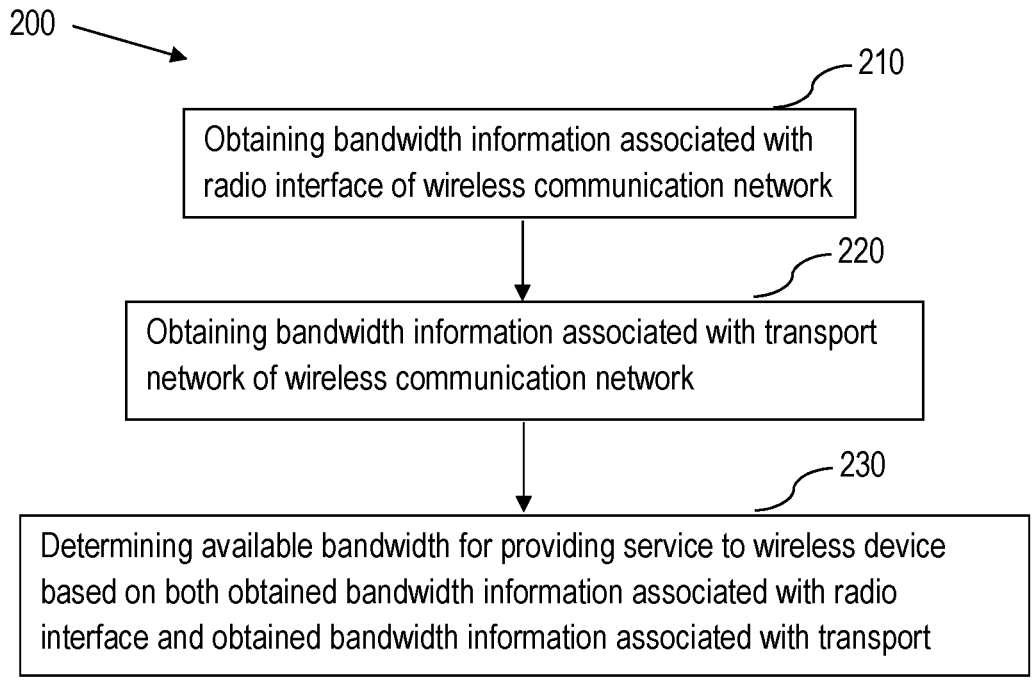
FIG. 2a is a flowchart of a method performed by a network node for providing a recommendation associated with a service to a wireless device, according to an exemplifying embodiment.
Figure 2B:
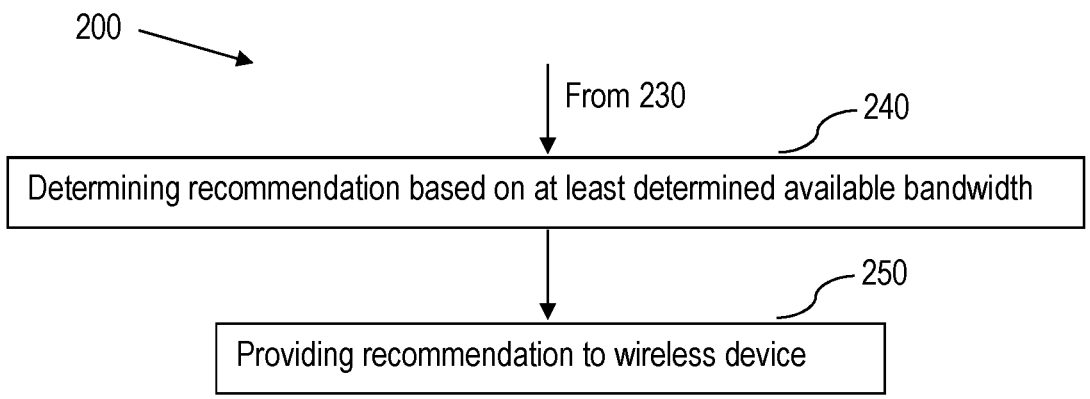
FIG. 2b is a flowchart of a method performed by a network node for providing a recommendation associated with a service to a wireless device, according to another exemplifying embodiment.

Embodiments herein relate to a method performed by a network node for providing a recommendation associated with a service to a wireless device. The network node is operable in a wireless communication network. Embodiments of such a method will now be described with reference to FIGS. 2a and 2b. FIG. 2a illustrates the method 200 comprising obtaining 210 bandwidth information associated with a radio interface between a radio access node of a Radio Access Network, RAN, of the wireless communication network and the wireless device; and obtaining 220 bandwidth information associated with a transport network of the wireless communication network. The method 200 further comprises determining 230 available bandwidth for providing the service to the wireless device based on the obtained bandwidth information associated with the radio interface and the obtained bandwidth information associated with the transport network.

The wireless communication network, may offer a plurality of different services to wireless devices. The services may be provided by means of an application server comprised in the wireless communication network or by an application server or other entity comprised in another network. The wireless communication network may comprise e.g. the RAN and a core network, wherein if the service is provided by an application server comprised in the wireless communication network, the application server may in one non-limiting example be comprised in the core network. This means that the service is provided to the wireless device by means of some sort of session being established between the wireless device and either the application server in the wireless communication network or a gateway of the wireless communication network towards another network in order to communicate with the application server providing the service. The gateway may be the termination of the wireless communication network, e.g. a Packet Data Network (PDN)-gateway, a Gateway General Packet Radio Service Support Node (GGSN) or a Network Address Translation (NAT)-gateway in an operator's service network or a peering-gateway (router) towards some other operator/ISP (Internet Service Provider) network. It is pointed out that the wireless device may be a mobile telephone, smartphone, laptop, TV, smart TV, or any other type of device which is able to communicate with the radio access node using the radio interface. Further, the wireless device may be a modem or dongle connected to another device by means of which the service is provided to the user, or application requesting the service. From the network node's point of view, the "end node" is the entity receiving transmissions from the radio access node, i.e. the wireless device, irrespective of whether the end destination of the service is comprised in the wireless device or is further delivered from the wireless device to another unit.

The RAN comprises the radio access node, and the radio interface is provided between the radio access node and the wireless device. The radio interface may have varying quality and/or bandwidth depending on e.g. the numbers of wireless devices communicating with the radio access node via the radio interface and/or physical characteristics between the wireless device and the radio access node such as distance between them, possible physical objects between the wireless device and the radio access node etc. Consequently, the bandwidth associated with the radio interface may vary and hence the network node obtains bandwidth information associated with the radio interface between the radio access node and the wireless device. There are several ways to obtain the information as will be described in more detail below.

The transport network may be seen as the network between two endpoints, the first endpoint being the radio access node and the second endpoint either being a gateway to another network, by which network the application service provider is reached, or being an application server comprised in the wireless communication network, e.g. in the core network of the wireless communication network. The transport network is thus the communication path between the first endpoint and the second endpoint. The transport network may comprise one or more intermediate nodes of different kinds. Merely as illustrating and non-limiting examples are switching nodes and relay nodes, base station controller, radio network node controller etc. In this disclosure, any node(s) in the communication path between the two endpoints is/are referred to as transport network nodes irrespective of its/their functionality. Further in this disclosure, when referring to "the application server", this means the option of the service being provided by an application server comprised in the wireless communication network. The transport network may also be associated with varying communication characteristics, such as available bandwidth, for example due to a current traffic load within the transport network. Thus the network node obtains bandwidth information associated with the transport network of the wireless communication network.

The network node may then determine available bandwidth for providing the service to the wireless device based on both the obtained bandwidth information associated with the radio interface and the obtained bandwidth information associated with the transport network. Using the information about the bandwidth associated with the radio interface and the bandwidth associated with the transport network, the network node may determine available bandwidth between the wireless device and either the application server or the gateway, wherein the wireless device and either the application server or the gateway may be said to constitute two endpoints between which the session may be set up to provide the service to the wireless device. The maximum available bandwidth may never be higher than the limits set by the bandwidth associated with the radio interface and the bandwidth associated with the transport network. Depending on the available bandwidth, different bitrates may be suitable for providing the service to the wireless device. In a simplified and non-limiting illustrative example, if the bandwidth associated with the radio interface may support the service being delivered to the wireless device with a bitrate of 1 Mbps and the bandwidth associated with the transport network may support the service being delivered to the wireless device with a bitrate of 10 Mbps, the maximum possible bitrate for providing the service to the wireless device is 1 Mbps.

The method performed by the network has several advantages. One possible advantage is that it may improve the end user Quality of Experience, QoE, by facilitating that for example a suitable media bit rate is used for video segments by using information about conditions in the radio interface as well as the transport network. In some embodiments, the solution also makes it possible to provide a suitable bandwidth recommendation associated with a service to the wireless device when the wireless device is served by multiple radio access node sites using carrier aggregation, CA, or dual connectivity, DC, by combining bandwidth information for the multiple radio interfaces and transport networks associated with the provision of the service to the wireless device. Furthermore, the interaction is between the wireless device and the wireless communication network via the radio access node, without involving/impacting the application service provider. There is thus only a relation between a subscriber's wireless device and the wireless communication network. There is no relation needed between the application service provider and the operator of the wireless communication network, which may be a big advantage since the number of application service providers compared to mobile operators is large.

The method may further comprise determining 240 a recommendation based on at least the determined available bandwidth, and providing 250 the recommendation to the wireless device.

Using at least the determined available bandwidth, the network node may determine the recommendation based on at least the determined available bandwidth to the wireless device. The recommendation provides the wireless device with information useful for e.g. determining which bitrate may be suitable to request for delivering the service to the wireless device. Merely as a simplified, illustrative and non-limiting example, assume the service is delivering a video clip to the wireless device. The video clip may comprise smaller segments which may be associated with different media bitrates. Generally, the higher the media bitrate, the more network bandwidth is required. Thus, the recommendation informs the wireless device about which media bitrate may be suitable for a segment, or segments, based on the available bandwidth in the example of the service being delivery of video.

Once the network node has determined the recommendation, the network node may provide the recommendation to the wireless device. In this manner, the wireless device may request the service to be delivered with a suitable bandwidth. Reverting to the simplified example above, this may improve e.g. the QoE since the wireless device may request a segment of a video clip with a media bitrate that is adapted to the available bandwidth so that the segment may be played out without freezing due to insufficient bandwidth.

The determining 240 of the recommendation may also be based on information associated with the wireless device and/or the service.

There is a plurality of different types of information that is associated with the wireless device that may influence how the network node determines the recommendation. In other words, not only the obtained bandwidth information may be used to determine the recommendation but also other information associated with the wireless device. The different types of information that may be used will be explained in more detail below.

Different services may be more or less time critical or may be more or less affected by a reduced bitrate. Merely as an illustrative and non-limiting example, a downloading of a data file may be less time critical than a video that is to be played out. Further, for some services, the QoE may not be severely adversely affected by a somewhat reduced bitrate.

In short, the information associated with the wireless device and/or the service may be used to determine the recommendation to be provided to the wireless device, which may result in that the recommendation of bandwidth may be close to the determined available bandwidth for providing the service to the wireless device, or may be a fraction of the determined available bandwidth.

The information associated with the wireless device may comprise one or more of (a) priority associated with the wireless device, and (b) capabilities of the wireless device.

In order for the network node to determine the recommendation in a way that is "good enough" without wasting too many resources, the network node may take information associated with the wireless device into consideration for determining the recommendation as just described above. There may be a plurality of wireless devices having ongoing services provided to them and there may be a plurality of requests for various services being transmitted from wireless devices. Consequently, not all the available bandwidth may be allocated to the wireless device. The determined available bandwidth for providing the service to the wireless device may need to be shared with one or more other wireless devices. Instead of just giving each wireless device an equal amount of the determined available bandwidth for providing the service to the wireless device, the network node uses the information associated with the wireless device to determine the recommendation. It is also pointed out that the network node may have knowledge about the number of wireless devices that are sharing the radio resources, i.e. the available bandwidth, wherein the network node may divide the available in equal amount of the determined available bandwidth among the wireless devices.

Different wireless devices may be associated with different types of subscriptions. A user of a wireless device generally has a type of subscription in order to make the wireless device operable in the wireless communication network, wherein different subscriptions may be assigned different priorities. Merely as an example, a first type of subscription may be less expensive than a second type of subscription, wherein wireless devices associated with the second type of subscription may be prioritised by the network node meaning that a recommendation to such a wireless device may comprise a higher bandwidth than a recommendation for a wireless device associated with the first type of subscription. This is a non-exclusive example of (a) the priority of the wireless device. The priorities may be in the form of Quality of Experience, QoE, and/or the Quality of Service, QoS, associated with the subscription.

The QoS may comprise one or more policies defining e.g. the priority of the wireless device. The QoE is a form of a quality measure of how well the service performs, and it may be used in addition to QoS as input to the determination of recommended bandwidth.

In another example, the wireless devices may have different capabilities, wherein a first type of wireless devices have capabilities enabling them to make use of higher bitrates than wireless devices of a second type. Merely as an example, a wireless device of the first type may have a more powerful or fast CPU (processing capability), and/or more memory capacity and/or higher or faster radio communication capabilities than a wireless device of the second type. These are some non-exclusive examples of (b) capabilities of the wireless device.

In an example, the information associated with the service comprise one or more of (i) type of service, (ii) latency requirements, (iii) client buffer level status, and (iv) deadline of delivery of service.

The information associated with the service may thus have several parameters. As described above, different services may require more or less bandwidth. A file transfer is for example of fixed size whereas a video may be associated with higher and/or lower media bitrate, which may affect for example the playout quality, e.g. by having better or worse resolution. Consequently, (i) the type of service may be taken into account by the network node when determining the recommendation to the wireless device.

As described above, different services have different latency requirements. For example, a streaming service in which a live news broadcast is played out to a user of the wireless device may be relatively time crucial, whereas playing an online quiz may be less time crucial. In this non-exclusive and non-limiting example, (ii) latency requirements associated with the service may influence the network node to award more bandwidth to a service associated with a live news broadcast being played out to a user of the wireless device and less bandwidth to a service associated with an online quiz.

A third example of information associated with the service that may be taken into consideration by the network node to determine the recommendation is (iii) client buffer level status. Reverting to the non-limiting example of video streaming, the wireless device comprises a video streaming application and a client, wherein the client downloads video segments and stores them in a client buffer. During playout the segments are taken from the client buffer and depending on the relation between how fast new segments are downloaded compared to the playout of video segments, the client buffer level will vary. It may be full or run empty. The information about if it is close to empty may be used by the wireless network to speed up the delivery, and/or to recommend a reduced bandwidth and thus a lower media bit rate.

The transport network may comprise a part of the wireless communication network between the radio access node and either an application server within the wireless communication network providing the service or a gateway of the wireless communication network towards a second communication network.

As described above, the transport network may be seen as the network between two endpoints, whereof the radio access node is one endpoint and the second endpoint is either the gateway to another network by means of which the application service provider is reached or an application server comprised in the wireless communication network, e.g. in the core network of the wireless communication network.

The transport network may comprise one or more intermediate nodes, also known as transport network nodes. The connection between the radio access node and any intermediate nodes may be wireless or wired, e.g. via radio or fibre. Each connection between two intermediate nodes may be seen as a sub-transport-network connecting two nodes in the path between the radio access network and the second endpoint, i.e. the application server (in the wireless communication network) or the gateway.

Since both the radio interface and the transport network are part of the wireless communication network, the wireless communication network may deduce or determine characteristics of the radio interface and the transport network. Consequently, there are various ways that the network node may obtain the bandwidth information associated with the radio interface and the bandwidth information associated with the transport network. Merely as an illustrative and non-limiting example, there may be a function implemented e.g. in the radio access node that monitors a usage level of the total amount of radio resources of the radio access node, thereby being able to deduce the amount of radio resource and thus bandwidth associated with the radio interface. Further, a function may be implemented in a node of the wireless communication network, e.g. in a node of a Operation, Administration and Maintenance, OAM, centre or system that monitors and/or collects information about various nodes, devices and/or entities of the wireless communication network. The node may request the information from such functions or may receive it regularly or irregularly without requesting it. An implementation example will be given below.

In an example, the radio access node comprises a first unit of the RAN and communicates with the application server or the gateway via at least a second unit of the RAN.

Depending on the implementation, e.g. with regard to the RAN, the RAN may comprise one, two or more units. For example, in Global System for Mobile communication, GSM, and Universal Mobile Telecommunications System, UMTS, and Long Term Evolution, LTE, the wireless device communicates via a base station, which is generally one unit, device or node. The base station may in some communication technologies be split into two or more units, devices or nodes. In this disclosure, such a split is referred to as a split RAN, so that instead of the wireless device, WD, communicating with a base station, BS or eNB, towards e.g. a switch, SW, i.e. WD↔BS↔SW, the BS comprises at least two units, U1 and U2, WD↔U1↔U2↔SW. In such a split, the radio access node comprises U1 ("closest" to the wireless device), wherein U1 communicates with U2, which in turn communicates with e.g. a node in the core network. The radio access node is the endpoint for both the radio interface and the transport network as described above. In case of split RAN, the radio access node comprising the first unit is the endpoint for (a) the radio interface between the wireless device and the radio access node; and (b) the transport network between the radio access node and either the application server or the gateway. In the split RAN, the second unit of RAN and possible additional unit(s) of RAN may be referred to transport network nodes as they form part from the transport network.

It is pointed out that there may be more than two units, i.e. the base station may be split in three, four or more units. However, the radio access node comprises the first unit, which thereby is an endpoint for both the radio interface and for the transport network. That is the radio access node comprising the first unit of RAN is an endpoint for both the radio interface and for the transport network. The additional units, U2, U3 etc. may communicate in between by means of radio, wire or fibre.

In another example, the wireless communication network supports dual connectivity, wherein the obtaining 210 of bandwidth information associated with the radio interface comprises obtaining respective bandwidth information associated with respective radio interface for each radio access node the wireless device is associated with, and wherein the obtaining 220 of bandwidth information associated with the transport network comprises obtaining respective bandwidth information associated with transport network for each radio access node the wireless device is associated with.

Dual connectivity allows a wireless device to be associated with, and communicate within the wireless communication network by means of two or more radio access nodes, see e.g. FIGS. 3$k$ and 3$m$. FIGS. 3$k$ and 3$m$ illustrate also the RAN being split into two units, DU (Distributed Unit) and CU (Centralised Unit). These figures will be explained in more detail later below. The wireless device may then physically communicate with two units, in FIGS. 3$k$ and 3$m$ illustrated as comprising two DUs each. In the figures, the wireless device is illustrated "logically" communicating with a function in a second unit comprising two CUs. It is pointed out that the physical communication takes place via a first unit comprising one or more DUs.

When the wireless device is associated with and communicates with two or more radio access nodes, the radio interface comprises two "connections" or sub radio interfaces. There is one radio interface between the wireless device and the first radio access node, one radio interface between the wireless device and the second radio access node etc. Consequently, the "total" radio interface, which in this disclosure is referred to as the radio interface, comprises each individual interface between the wireless device and each individual radio access node it is connected to. Thus, when obtaining 210 bandwidth information associated with the radio interface, the network node obtains respective bandwidth information associated with respective radio interface for each radio access node the wireless device is associated with.

Each radio access node the wireless device is associated with can be said to have its "own" transport network to the application server or the gateway. In other words, there is one transport network between the first radio access node and the application server or the gateway and a second transport network between the second radio access node and the application server or the gateway, etc. Consequently, the "total" transport network, which in this disclosure is referred to as the transport network, comprises each individual transport network between each individual radio access node and the application server or the gateway, each individual transport network comprising one or more transport nodes. Thus, when obtaining 220 bandwidth information associated with the transport network, the network node obtains respective bandwidth information associated with transport network for each radio access node the wireless device is associated with. It is pointed out that there may be transport network nodes and thus segments within the individual transport networks that may be common for two or more individual transport networks.

The wireless device may also make use of Carrier Aggregation, Calif., in case the wireless communication network supports that feature. This means that the wireless device may have two or more carriers set up between itself and the radio access node(s). In an illustrative and non-limiting example, the wireless device has three carriers set up between itself and the radio access nodes. In this example, there are three radio interfaces between the wireless device and the radio access node. Consequently, the radio interface has a bandwidth based on three carries and the obtaining 210 of bandwidth information associated with the radio interface comprises obtaining bandwidth information associated with all the carriers set up between the wireless device and the network node.

The determining 230 of available bandwidth for providing the service to the wireless device may be based on the obtained bandwidth information associated with the radio interface for each radio access node the wireless device is associated with and the obtained bandwidth information associated with the transport network for each radio access node the wireless device is associated with.

As described above, in case the wireless device is associated with two or more radio access nodes, the radio interface bandwidth and the transport network bandwidth may be affected. Thus the network node obtains the bandwidth information associated with the radio interface by obtaining respective bandwidth information associated with respective radio interface for each radio access node the wireless device is associated with, and the network node obtains bandwidth information associated with the transport network by obtaining respective bandwidth information associated with transport network for each radio access node the wireless device is associated with.

The network node may then determine the available bandwidth for providing the service to the wireless device based on the both the obtained bandwidth information associated with the radio interface for each radio access node the wireless device is associated with and the obtained bandwidth information associated with the transport network for each radio access node the wireless device is associated with.

Embodiments will now be described by means of an implementation example, with reference to FIGS. 3a-3l. The implementation example is based on two background concepts, Network Assisted Rate Adaptation, NARA, and Radio & Transport Interaction, RTI.

Figure 3A:
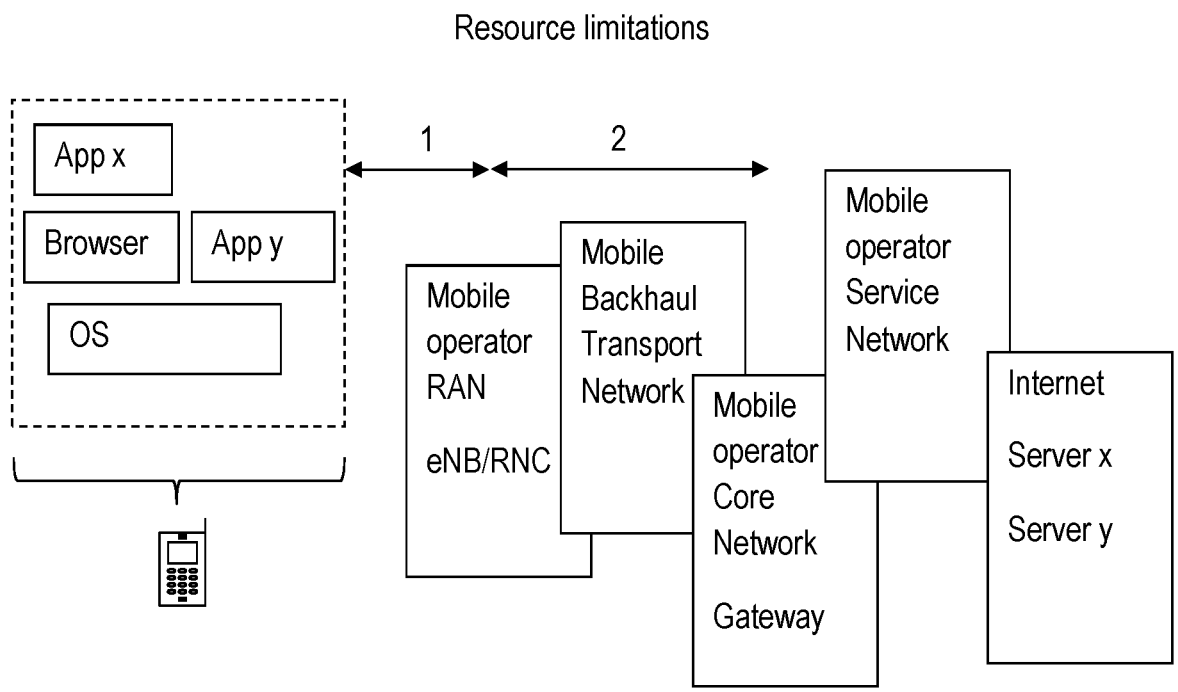
FIG. 3a is an exemplifying illustration of a communication path between a wireless device and the Internet.
Figure 3B:
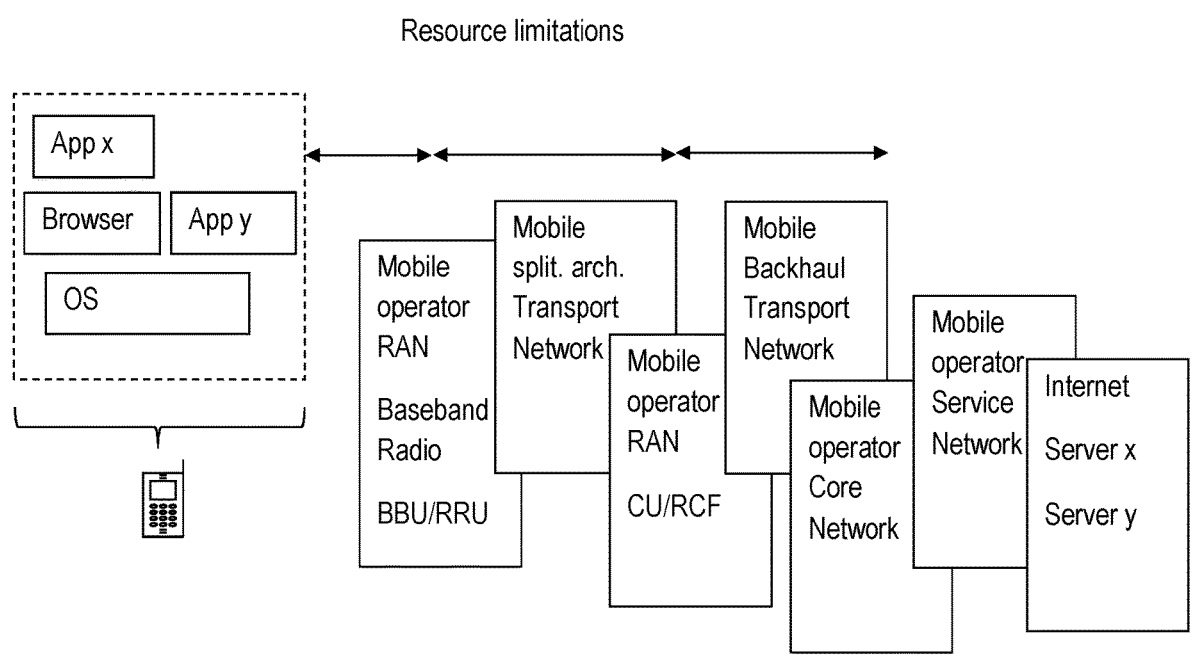
FIG. 3b is another exemplifying illustration of a communication path between a wireless device and the Internet.

FIGS. 3a and 3b are exemplifying illustrations of a communication path between a wireless device and the Internet. FIGS. 3a and 3b illustrate the wireless device running two applications, "App x" and "App y", which applications communicating with their respective application service provider located on Internet via the mobile operators RAN/Core/service network. To take the Dynamic Adaptive Streaming over HTTP, DASH, and Adaptive Bitrate Streaming video (e.g. MPEG-DASH or HLS) features as examples (which are examples of Adaptive Bit Rate, ABR), for these features the video server has the video encoded in different bitrates, and selects the format based on throughput estimations. To get an accurate estimation for what bandwidth the wireless device client/app will get, the current conditions of the whole communication path should be considered. With split architecture, the RAN is split into at least two parts, there is the 'upper' part with higher layer control and user plane functions and a 'lower' part handling the radio interface and related processing. In-between these parts there is a transport network. There may be transport limitations (bottlenecks) in the split architecture transport as well as in the backhaul parts of the transport network.

In a 5G, i.e. $5^{th}$ Generation of wireless communication, or split architecture scenario there may also be additional transport network segments that should be considered as illustrated in FIG. 3b. It is pointed out that the mobile operator service network may be comprised in the wireless communication network.

Figure 3C:
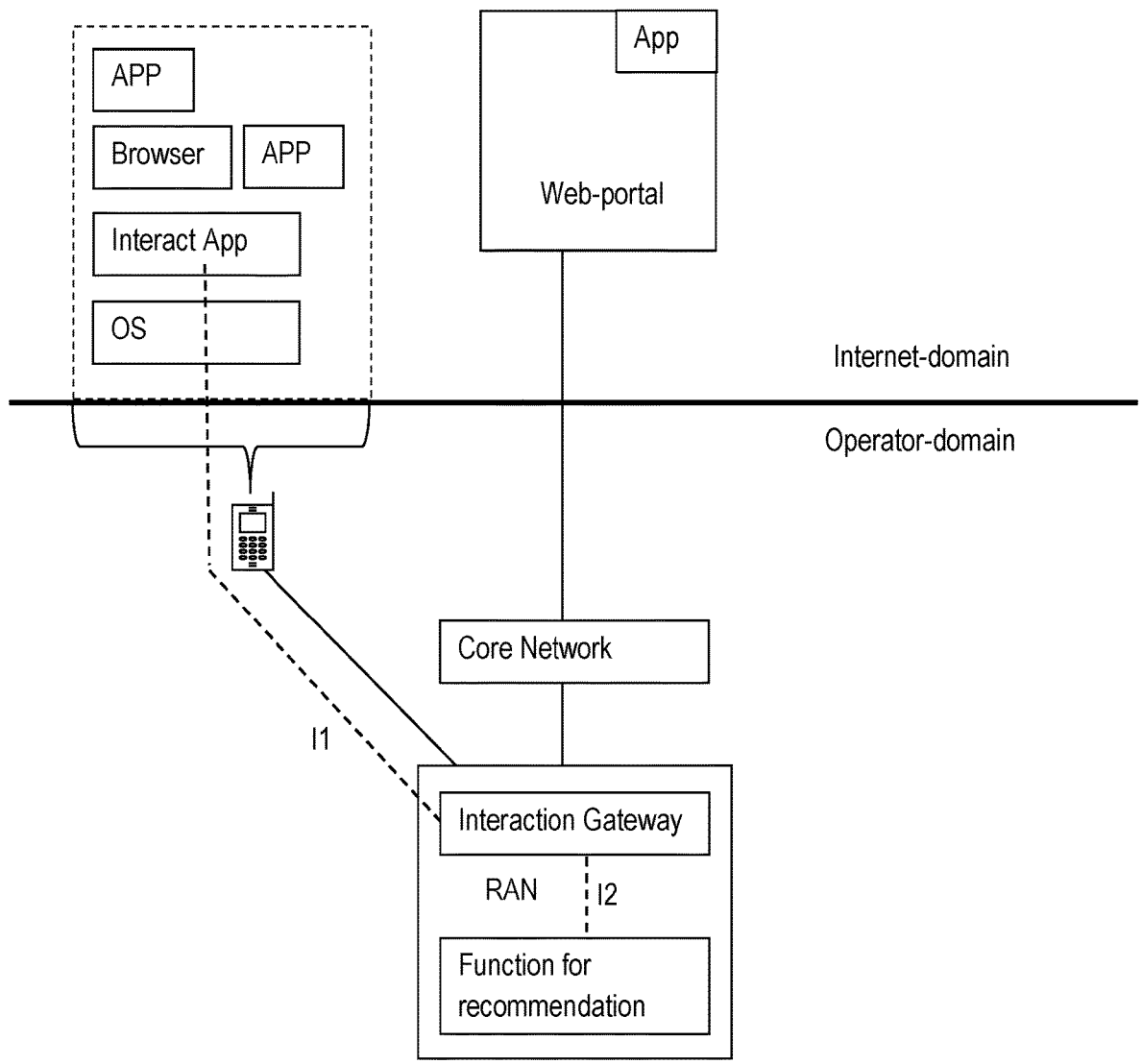
FIG. 3c is yet an exemplifying illustration of a communication path between a wireless device and the Internet.
Figure 3D:
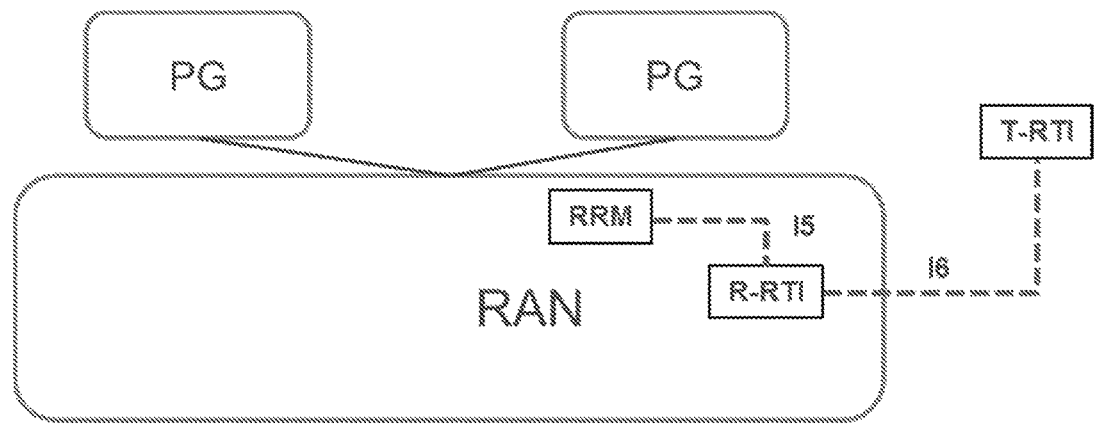
FIG. 3d is an exemplifying illustration of Radio Transport Interaction, RTI.

FIG. 3c illustrates a NARA example. Assume the wireless device request a video that is available in different encodings, sizes and/or quality (thereby requiring different amount of bandwidth when streamed or delivered to the wireless device) and therefore sends a query on the I1 radio interface to the Mobile system, Interaction Gateway, IGW, asking for suitable available bandwidth. The IGW may query over I2 interface the Functions for Recommendation, what available Radio bandwidth there is, and responds this bandwidth to IGW that in turn informs the wireless device. In this example the Interaction Gateway, IGW, is placed in the RAN. In an example, the IGW may be comprised in the network node, which in turn may be comprised in e.g. Mobile operator RAN or in Mobile operator Service Network illustrated in FIG. 3b.

The RTI concept is based on that a Radio Resource Management, RRM, function requests transport information such as available transport bandwidth from e.g. an RAN-RTI, R-RTI, function. R-RTI function may then in-turn subscribe to specified transport information e.g. from a transport domain Transport-RTI, T-RTI, function. The transport information may get reported to the RRM function that may take a more holistic RRM decision based on both Radio and Transport conditions. See FIG. 3d.

Figure 3E:
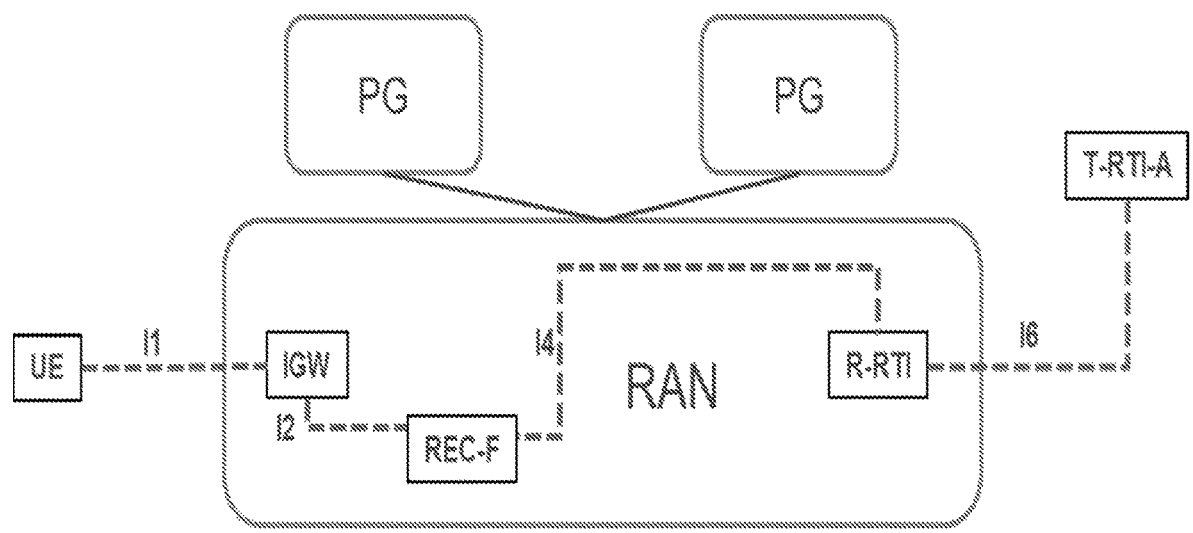
FIG. 3e is another exemplifying illustration of RTI and NARA.
Figure 3F:
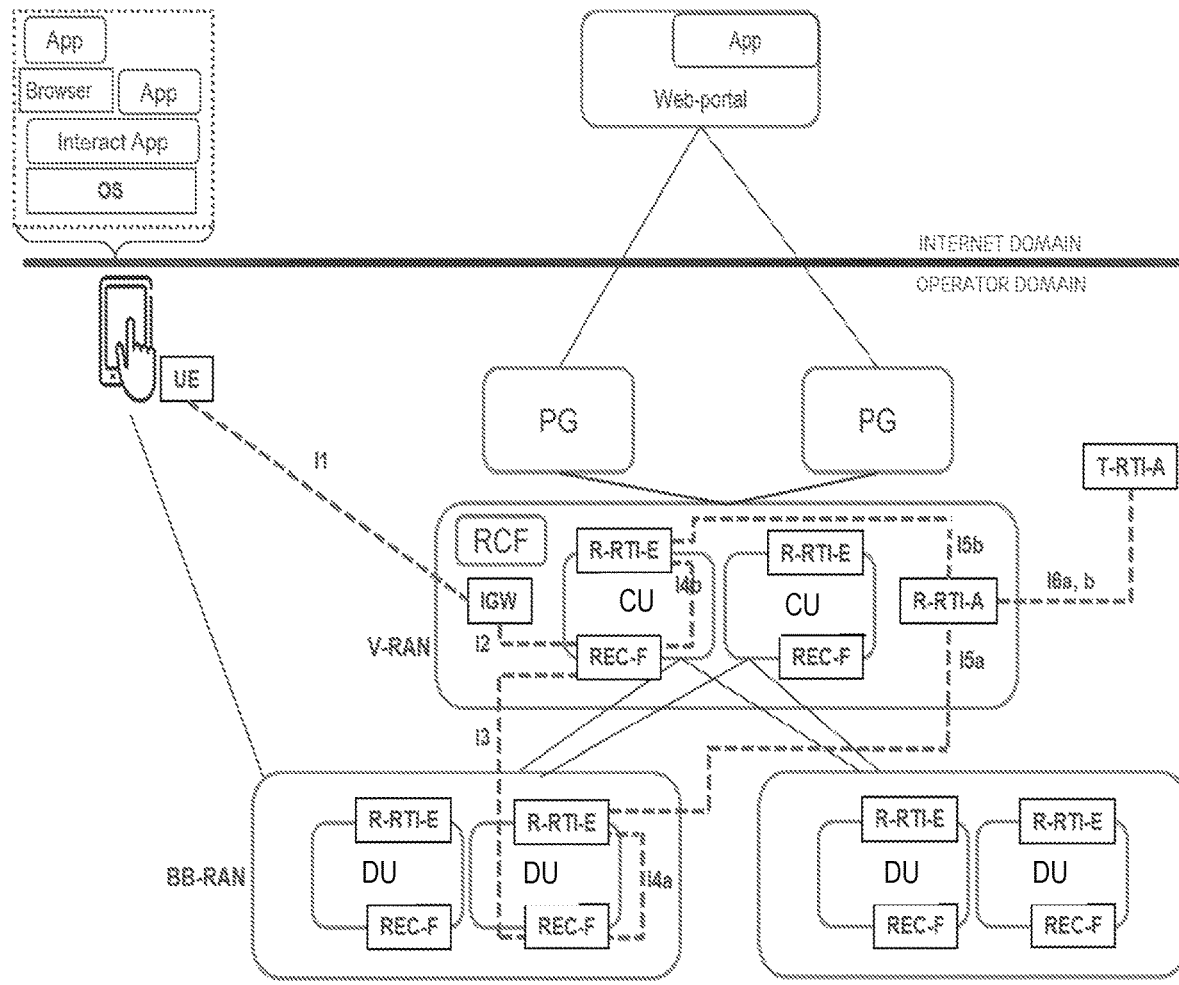
FIG. 3f is an exemplifying illustration an implementation example in a split Radio Access Network, RAN, architecture.
Figure 3G:
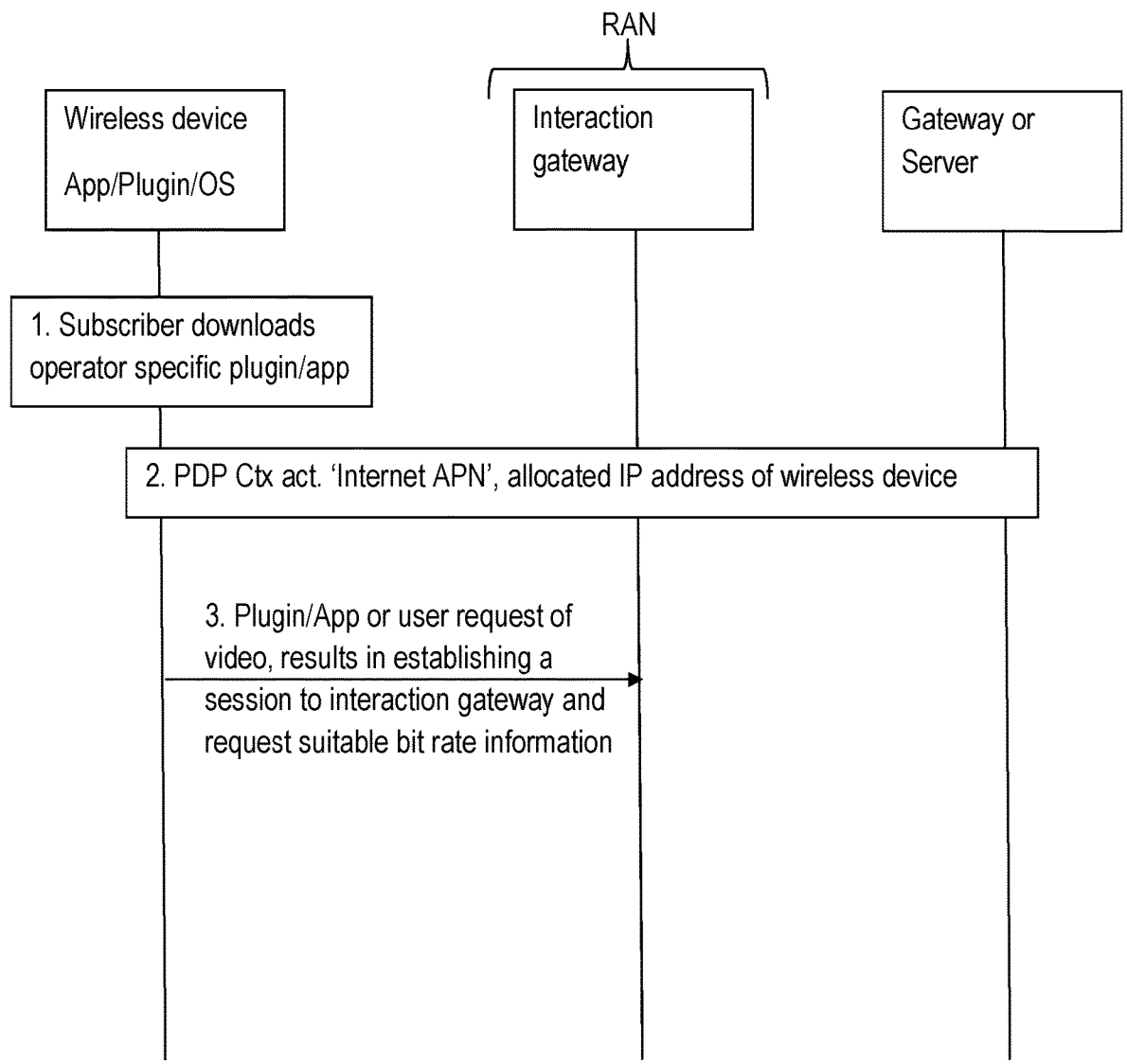
FIG. 3g is a signalling diagram of an initiation procedure.
Figure 3H:
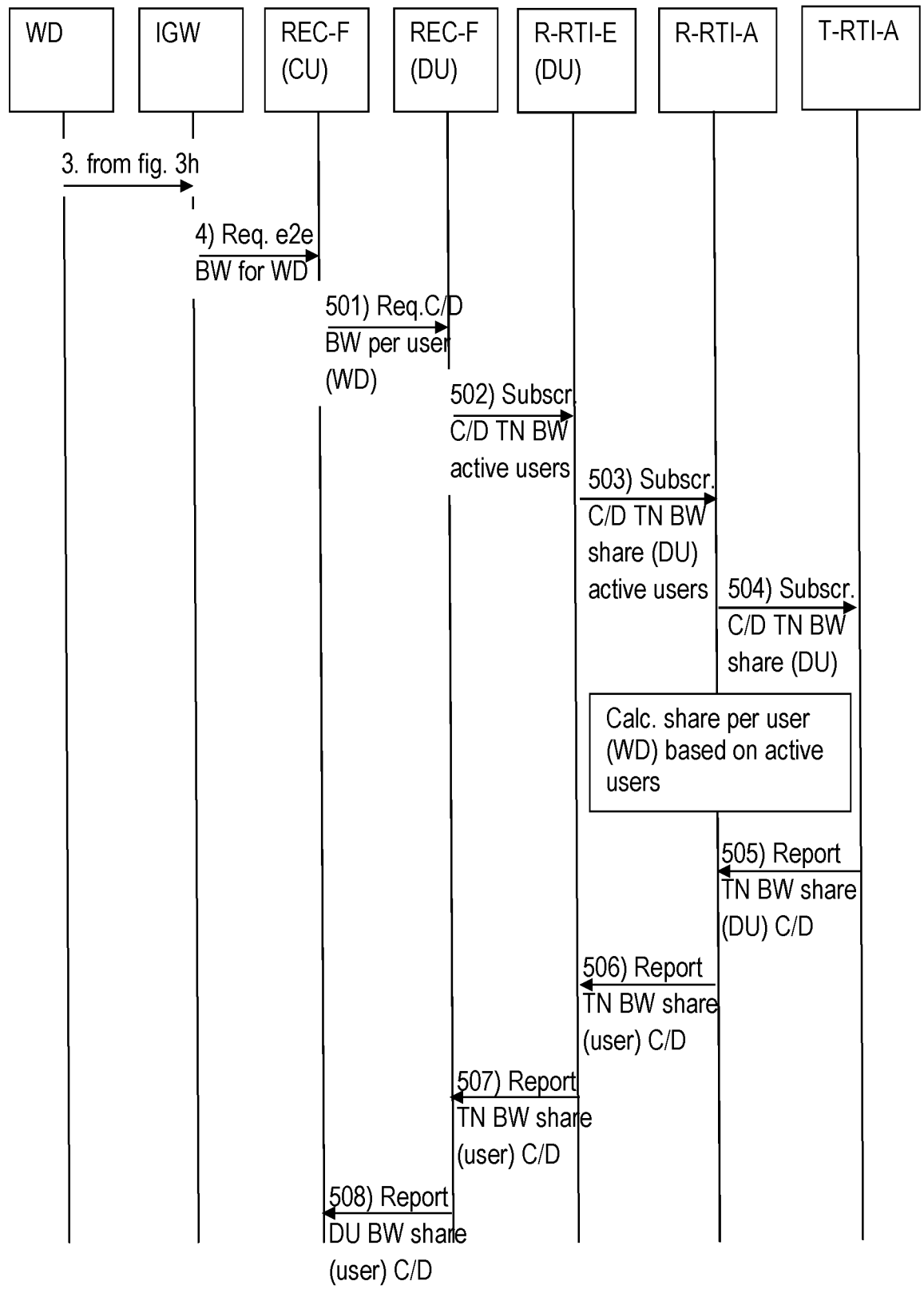
FIG. 3h is a signalling diagram of an exemplifying embodiment of providing a recommendation to a wireless device, WD, in a split RAN architecture.
Figure 3H:
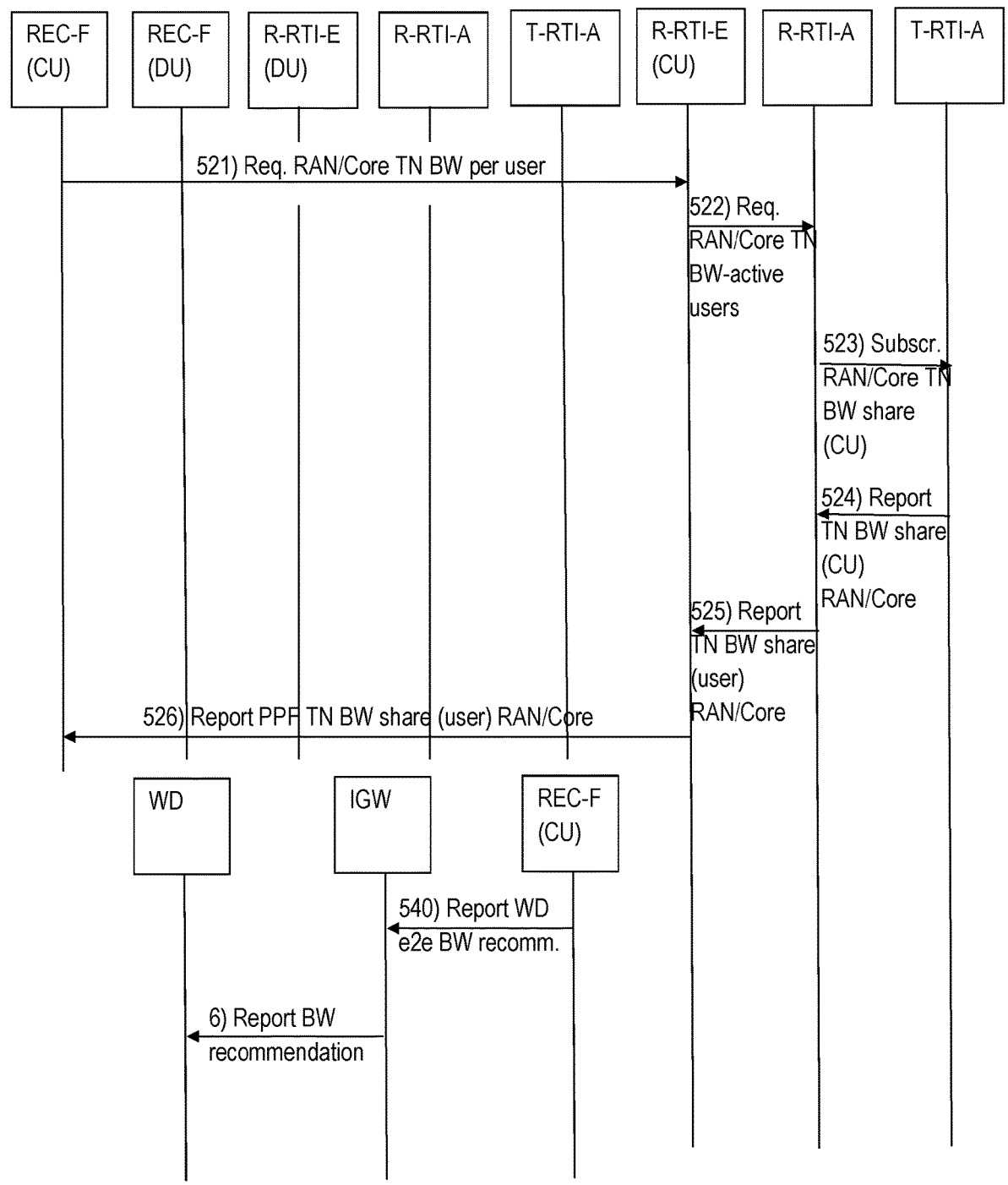

In FIG. 3e, such an interface is illustrated and it is in this example named I4. In this manner, the RAN Transport Interaction, RTI, functions have been added to also incorporate the transport characteristics in the throughput estimation provided to the wireless device client/APP, this is done over the I4 interface.

FIG. 3e illustrates that the RAN-RTI, R-RTI, communicates over I6 interface with a Transport-RTI-Aggregator, T-RTI-A, function. These RTI functions are aware of the transport network characteristics. The RAN function for Recommendation, REC-F, communicates with RAN RTI function using the I4 interface. The REC-F function combines the information from the RAN RTI and Radio information from RAN. The principles for "RTI-internal" signalling is prior art and out of the scope of this disclosure. In an example, the R-RTI subscribes to defined transport characteristics parameters such as bandwidth, latency etc. from the Transport RTI Aggregator, T-RTI-A. Several other parameters such as e.g. the reporting intervals may also be specified in the subscribed information to be able to match any user or application needs.

The wireless device may query the Interaction GW, IGW, over I1 interface, for suitable end-to-end bandwidth (between the application server or gateway and UE), and assuming both Radio and Transport available bandwidth for video with certain characteristics. In the query from the wireless device, the associated end-point information may be enclosed. The IGW in turn requests suitable end-to-end bandwidth (between gateway or application server and the wireless device) from the Recommendation function, REC-F, over the I2 interface. The REC-F function has Radio bandwidth information but needs to request transport information from RAN RTI Entity over the I4 interface in this implementation example. The specific transport information asked for and the reporting interval may be dependent on the use-case but it may for example be:

Maximum possible and momentarily available transport bandwidth between RAN and Core site uplink & downlink, i.e. the radio access node and the gateway or the application server.

Momentarily latency uplink & downlink between RAN and Core site, i.e. the radio access node and the gateway or the application server.

The REC-F function may then, based on Radio and Transport available bandwidths, determine a bandwidth proposal (recommendation) and send it to the IGW over I2 interface. IGW may thus send a suitable bandwidth proposal for the available bandwidth to the user (wireless device) over the I1 interface. The wireless device may then request a video stream according to proposed bandwidth. The REC-F function may be implemented in the above described network node, which may be any node in the RAN or the core network, although in this exemplifying implementation it is generally illustrated as comprised in radio access node.

One principle that the REC-F function may use, is to select the lowest available bandwidth value of the two (Radio & Transport). But it could also choose to divide the total available bandwidth between wireless devices differently to ensure a more optimised use of the total bandwidth capacity.

The REC-F function may also use possible latency variation information from the RTI-R to e.g. propose to the wireless device to download video-segments earlier/download more video-segments in advance to avoid the risk of starvation in the playout buffer of the wireless device due to large delay in the network.

The REC-F function may be set to subscribe to transport information form the RAN RTI function over the I4 interface including the interval for such reporting.

When considering 4G/5G and if split architecture is applied, i.e. split RAN as described above, characteristics and status for additional transport domains needs to be considered as illustrated below.

FIG. 3$f$ is an illustration of a split RAN. Here the transport networks between Virtualised RAN, V-RAN, and Core network Packet Gateway, PG, (the option of the service being delivered by means of an application server comprised in the wireless communication network is not shown) as well as between V-RAN and Base Band RAN, BB-RAN, needs to be considered. Since BB-RAN to V-RAN spans over a network the RAN RTI Entity at DU obtains information about those specific transport segments and provides this information to the DU REC-F function via I4a interface. The REC-F function at DU site provides over I3 the combined Radio and Transport bandwidth information (DU to CU) to REC-F function at CU site. The RAN RTI Entity at CU obtains information about path between V-RAN site (CU) and Core-site and provides this information to the CU REC-F function via I4b interface. In FIG. 3$f$, the RAN or the base station is split in two units, the first unit is the BB-RAN and in FIG. 3$f$ there are two nodes of the first unit type comprising two DUs each. The second unit of the RAN is the V-RAN and in FIG. 3$f$ there is one such node of the second unit type comprising two CUs.

If the wireless device is using dual Radio interface e.g. Carrier Aggregation and is connected to two different DU's, then the REC-F will learn this from the CU and further request and receive information from two REC-F, and then aggregate this information, see FIG. 3$j$.

Below are exemplified signalling sequences or diagrams for the split architecture or RAN, first is an initiation diagram.

FIG. 3$g$ is a signalling diagram of an example of initiation signalling. In FIG. 3$g$, the first initial steps are illustrated when a wireless device gets its App/Plugin software, establishes its IP connectivity, connects to video server/application, and gets applicable video-encoding information and finally issues the bandwidth query towards Interaction GW, IGW.

FIG. 3$h$ is a signalling diagram for a split architecture, aka a split RAN see FIG. 3$f$, and it has all steps performed based on a first bandwidth query from a wireless device. After the first query is fully executed, there may be a number of "subscribed bandwidth reporting" steps that optionally don't have to be repeated. The signalling diagram in FIG. 3$h$ shows this limited signalling example.

FIG. 3$h$ illustrates the exemplifying scenario where an App/browser plugin/OS (Operation System) is used to provide information to the mobile network (the network node) about the capability of the wireless device to handle this new feature/protocol and to initiate the communication. The entities needed for interaction has been illustrated as internal RAN and transport entities in this example. The entities are functions for Recommendation, REC-F, Interaction GW, IGW, RAN RTI Entity, R-RTI-E, RAN RTI Aggregator, R-RTI-A, and Transport RTI Aggregator, T-RTI-A. However, the IGW and REC-F functions may be stand-alone entities or co-located with other entities. Also placement of RTI functions may vary, e.g. for the split RAN variant (illustrated in FIG. 3$g$) where functions for Recommendation are located in both the BB-RAN and V-RAN, and thus a network protocol may be needed for communication. The Interaction GW is shown as the entity that handles signalling to the wireless device client/app/OS.

1. A subscriber downloads a plugin or App that enables communication with the mobile network interaction gateway function. (This could also be functionality in the operating system of the wireless device, i.e. this functionality is turned on).

2. The wireless device activates a packet data connection, i.e. it gets an IP address from the mobile network and connectivity.

3. A video App/Plugin/OS is initiated or a user requests a video by other means; it's also known if the video is available in different bandwidth encoded segments, i.e. segments encoded with different media rates, and the length of the segments are known and thus the time interval for changing bandwidth encoding. The wireless device may have a functional entity (e.g. App, plugin, browser or Operating System, OS, that determines if video is available in multiple different bandwidth encoded segments, The App/plugin/OS then initiates a connection to the mobile network interaction gateway function with a new protocol. The address/URL to use towards the mobile network may be provided in several ways, e.g. provided with the operator specific plugin/App, or a configuration SMS, etc. The protocol used may be a new protocol running over e.g. UDP or TCP. This new protocol may then be used to inform the mobile network Interaction GW function about what bit rate formats the video is available in and the segment length, thus the time interval for which the video may be changed. The protocol may also be used by the wireless device to request information about a suitable bandwidth from the mobile network interaction gateway function. The wireless device will receive information about a suitable bandwidth to use (e.g. video encoding media bitrate).

4. The IGW sends a request to CU Function for Recommendation (REC-F) for suitable bandwidth for video between the gateway (also illustrated in some figures as PG) and the wireless device. The request contains end-points identification including the different video encoded bandwidth and time interval for change of bandwidth (video segment length).

5. (501) The CU knows which DU the wireless device is connected to, so CU function or Recommendation (REC-F) sends a request to the DU function or Recommendation (REC-F) for a suitable CU-to-UE bandwidth for video. The request contains wireless device and CU end-point identification including the different video encoded bandwidth and time interval for change of bandwidth.

6. (502) The REC-F function knows the radio conditions but needs to request information regarding transport between DU and CU. The REC-F sends a subscribe request for (continuous, regular or irregular) bandwidth reporting to the local RAN-RTI-Entity (R-RTI-E), the request contains DU and CU end-point identification but also the number of active user on the specific DU. The subscribe request may also contain reporting interval.

7. (503) The R-RTI-E function needs to know the share of transport bandwidth between CU and DU, therefore R-RTI-E sends a subscribe request to R-RTI-A function. The subscribe request contains DU and CU end-point identification but also the number of active user on the specific DU. The subscribe request may also contain reporting interval.

8. (504) The R-RTI-A function needs to receive transport bandwidth information between the specific CU and DU-site from the transport domain. R-RTI-A sends a subscribe request to Transport-RTI-Aggregate (T-RTI-A) function for available bandwidth between the specific CU and DU-site. The subscribe request may contain DU and CU end-point identification and requested reporting interval.

9. (505) The T-RTI-A function then continuously, regularly (e.g. according to the requested reporting interval) or irregularly (e.g. when a change occurs) reports the available transport bandwidth between the CU and the DU-site to the R-RTI-A function. The available transport bandwidth is the communication resources between the CU and the DU site irrespective of how much is currently in use vs. being unused.

It is pointed out that the different reporting time intervals above in points 6-9 may be individual and differ in between themselves.

10. The R-RTI-A function may now calculate the per active user (wireless device) bandwidth share between CU and the DU-site based on the reported number of active users from all DU's in the specific DU-site, and the available bandwidth between the CU and the DU-site.

11. (506) The R-RTI-A function may then continuously, regularly (e.g. according to the requested reporting interval) or irregularly (e.g. when a change occurs) report the per active user (UE) available transport bandwidth between the CU and the DU-site to the R-RTI-E function in the DU.

12. (507) The R-RTI-E function may now continuously, regularly (e.g. according to the requested reporting interval) or irregularly (e.g. when a change occurs) report to REC-F the per active user (UE/wireless device) available transport bandwidth between the CU and the DU.

13. The REC-F function now has information on DU available Radio bandwidth and CU to DU available Transport bandwidth, and may determine e.g. the minimum bandwidth of Radio and Transport. Given that REC-F has information on the different video encoded bandwidths and time interval for change of bandwidth (video segment length) both for the current request but also for all existing video streaming segments, the REC-F function may determine a more efficient division of the total available bandwidth between users (wireless devices).

14. (508) The BBF REC-F function reports to the CU REC-F function the suitable bandwidth between CU-to-UE for the user (wireless device, WD)

15. (521) The CU REC-F function now needs the available transport bandwidth between Core site PG and CU. The REC-F function sends a request to the R-RTI-E function (CU), the request contains Core site PG and CU end-point identification and also the number of active users (wireless devices) on the specific CU.

16. (522) The R-RTI-E function (CU) sends a subscribe request to R-RTI-A function, the request contains Core site PG and CU end-point identification but also the number of active users on the specific CU. The subscribe request may also contain reporting interval.

17. (523) The R-RTI-A function sends a subscribe request for available transport bandwidth between specific Core site PG and CU sites, the request is sent to transport domain T-RTI-A function. The request contains PG and CU end-point identification and required reporting interval.

18. (524) The T-RTI-A function then continuously, regularly (e.g. according to the requested reporting interval) or irregularly (e.g. when a change occurs) reports the available bandwidth between Core site PG and CU site to the R-RTI-A function.

19. The R-RTI-A function has information on CU-site all active users (wireless devices) and what CU and Core they relate to, thus the R-RTI-A may now calculate the per active user available Transport bandwidth between Core site PG (gateway) and the specific CU.

20. (525) The R-RTI-A function now continuously, regularly (e.g. according to the requested reporting interval) or irregularly (e.g. when a change occurs) reports the per active user (wireless device) available transport bandwidth between Core PG and CU, to the R-RTI-E function in the CU.

21. (526) The R-RTI-E function now continuously, regularly (e.g. according to the requested reporting interval) or irregularly (e.g. when a change occurs) reports to REC-F the per active user (wireless device) available transport bandwidth between Core site PG and CU.

22. The REC-F function now has information on DU available Radio bandwidth and PG to DU available Transport bandwidth, and may determine e.g. the minimum bandwidth of Radio and Transport. Given that REC-F has information on the different video encoded bandwidths and time interval for change of bandwidth (video segment length) both for the current request but also for all existing video streaming segments, the REC-F function may determine a more efficient division of the total available bandwidth.

23. (540) The REC-F function reports a suitable Core site PG to wireless device bandwidth (for video to the requesting user (wireless device)) to the IGW function.

24. (6) The IGW function now proposes a suitable bandwidth to the user (wireless device) for the requested video stream.

25. The App/Plugin/OS now request a video segment from the Video service according to proposed suitable bandwidth.

After the first initiation procedure, with all steps 1-25, a number of continuous bandwidth reporting and calculation processes may be running. As long as there are no changes in the number of active users (or span of active users), the procedure may continue in a limited number of steps where the RTI functions perform continuous transport bandwidth reporting based on the existing information on active users, see e.g. diagram in FIG. 3*i*.

Figure 3I:
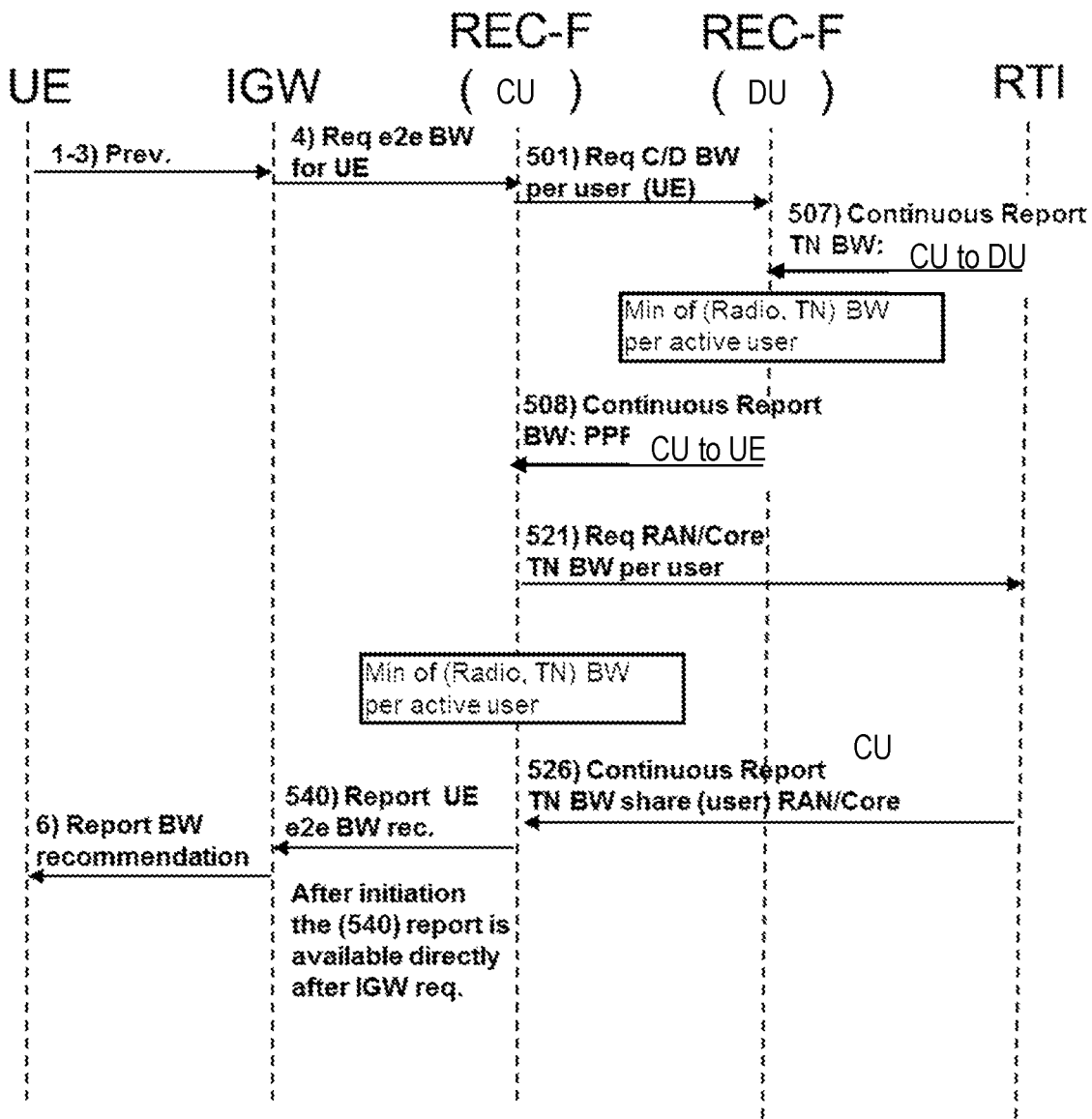
FIG. 3i is a signalling diagram of another exemplifying embodiment of providing a recommendation to a wireless device, WD, in a split RAN architecture.
Figure 3J:
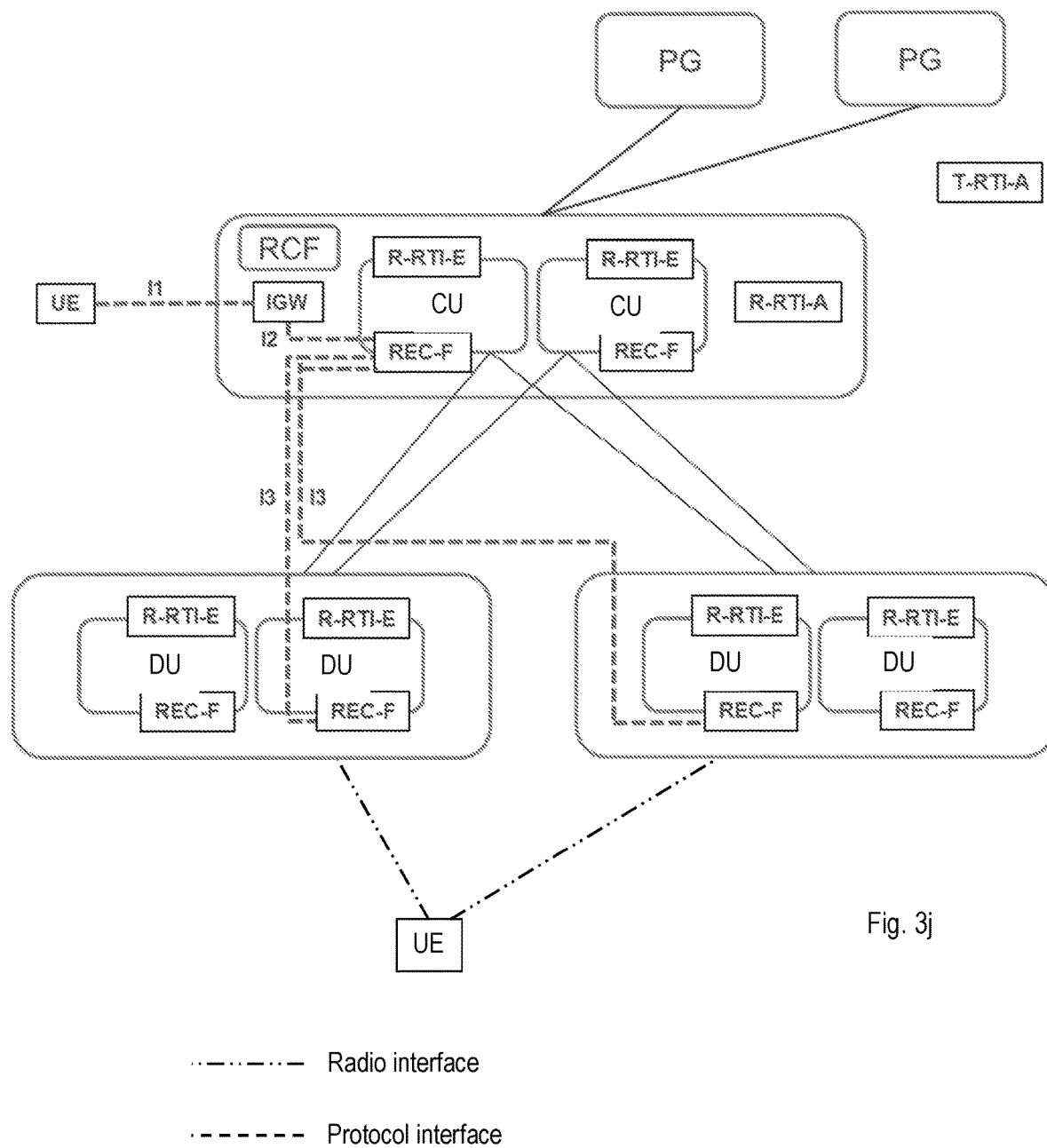
FIG. 3j is an exemplifying illustration of an implementation example in a split RAN architecture and dual connectivity.

After the first query is fully executed there may be a number of "subscribed bandwidth reporting" steps that optionally don't have to be repeated. The signalling diagram in FIG. 3*i* shows this limited signalling example.

In a traditional LTE architecture, the user-plane CU and DU functions are combined into the evolved e Node B, eNB function, RAN node. Therefore, some of the functions may disappear and thus also the related signalling steps may disappear for an LTE architecture, see FIG. 3f. The REC-F at DU and CU becomes just one REC-F (RAN function for recommendation), the interfaces I3, I5a, I5b disappear and I4a & I4b becomes just I4. The remaining steps in the signalling diagram are in principle the same.

The method described in this disclosure may be used in many applications and variants. One other example is the Dual Connectivity, DC, as described above, where a wireless device is associated with (or connected to) two or more radio access nodes (and thus two radio interfaces) simultaneously, and thus also multiple DUs. Now there are two or more I3 interfaces, see simplified FIG. 3j.

Figure 3K:
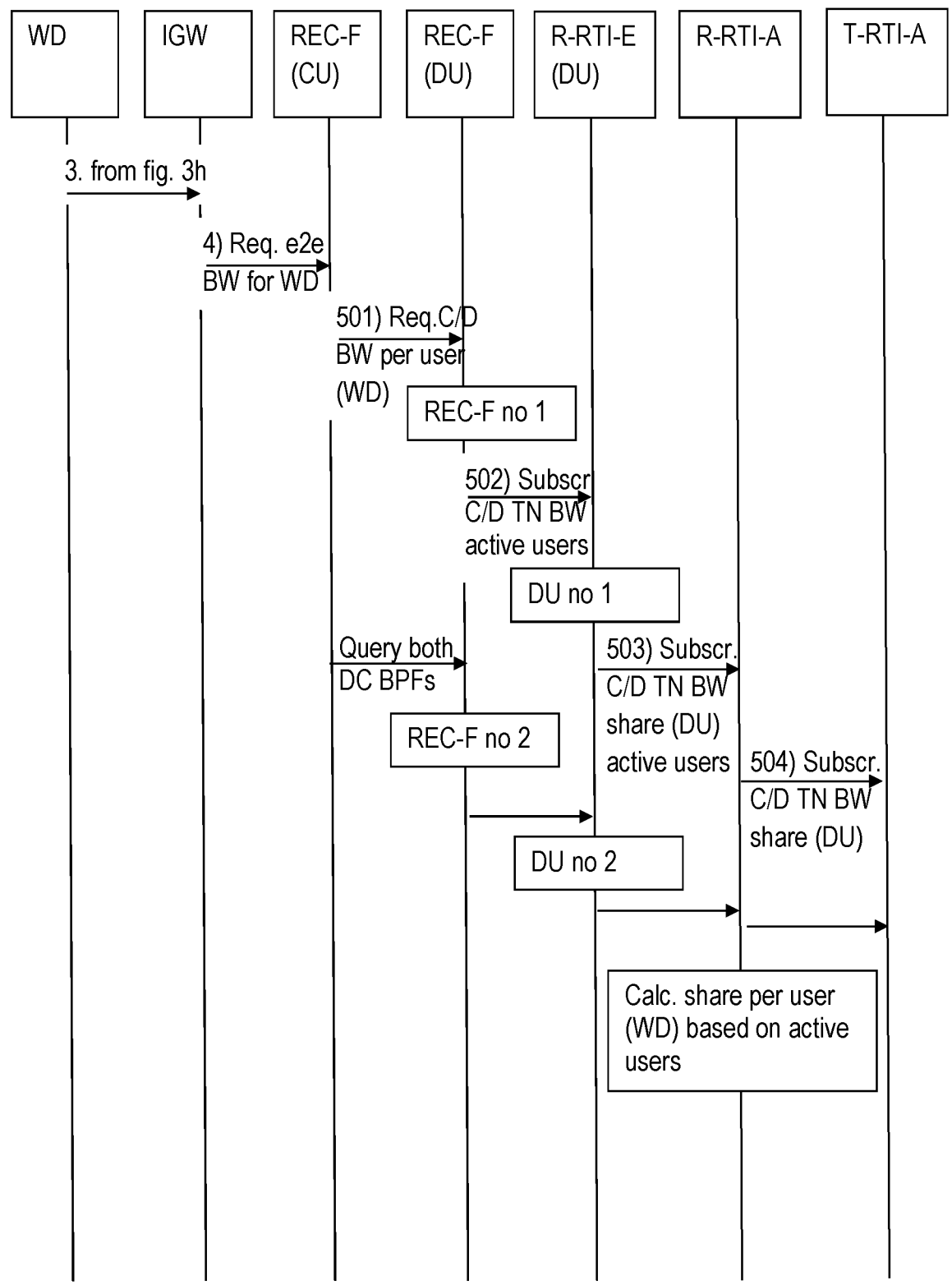
FIG. 3k is a signalling diagram of an exemplifying embodiment of providing a recommendation to a wireless device, WD, for dual connectivity.
Figure 3K:
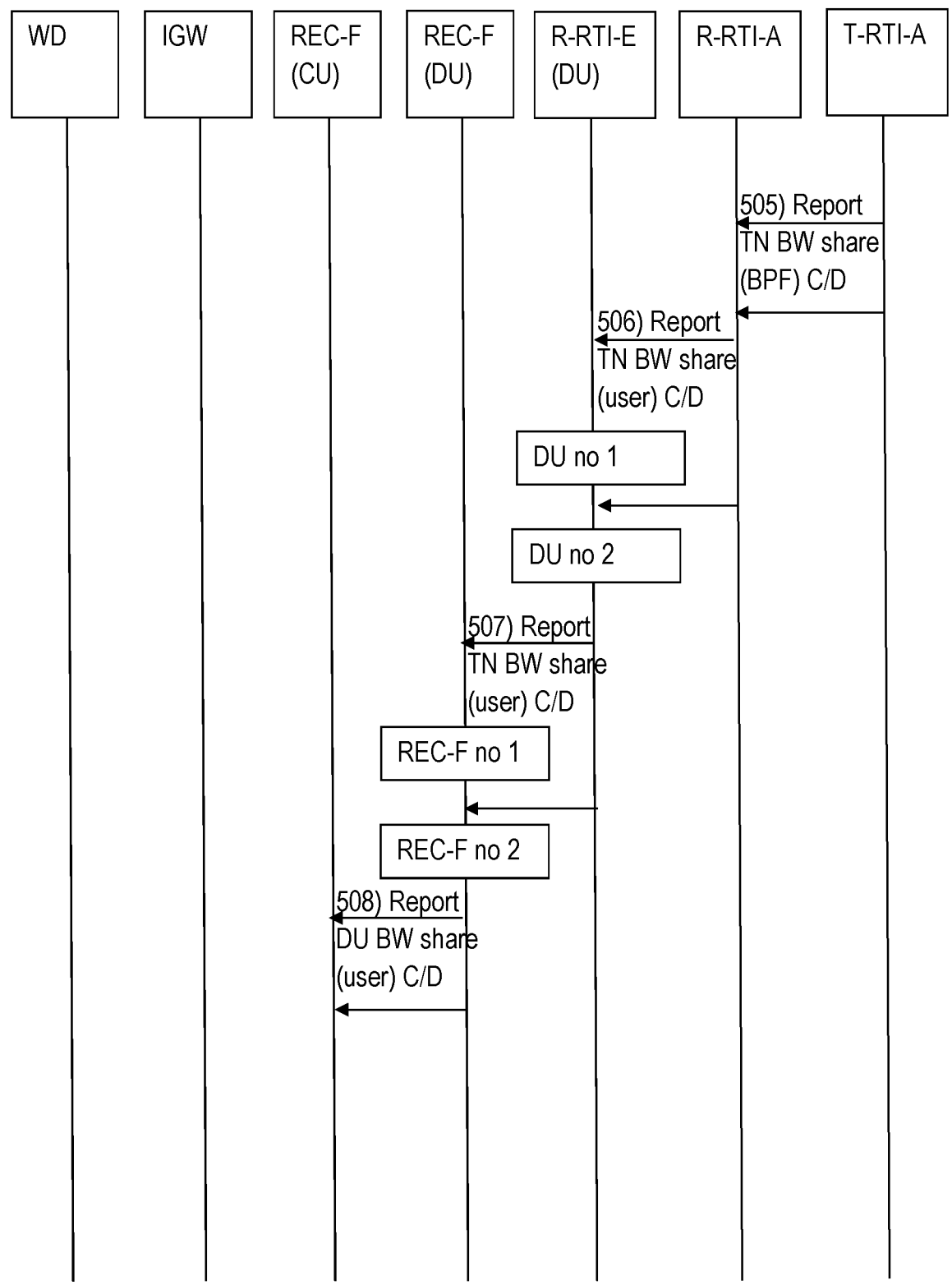
Figure 3K:
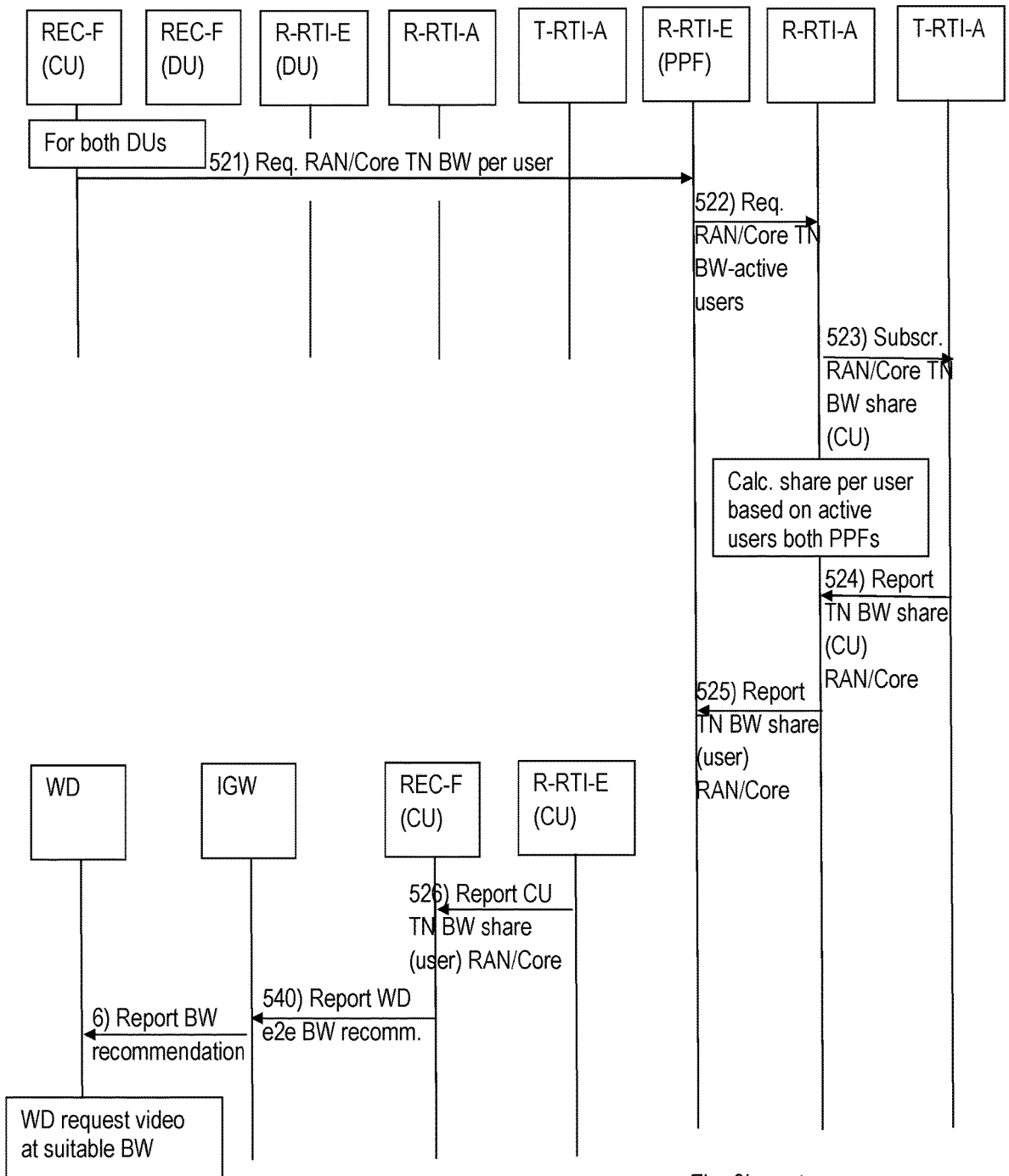
Figure 3I:
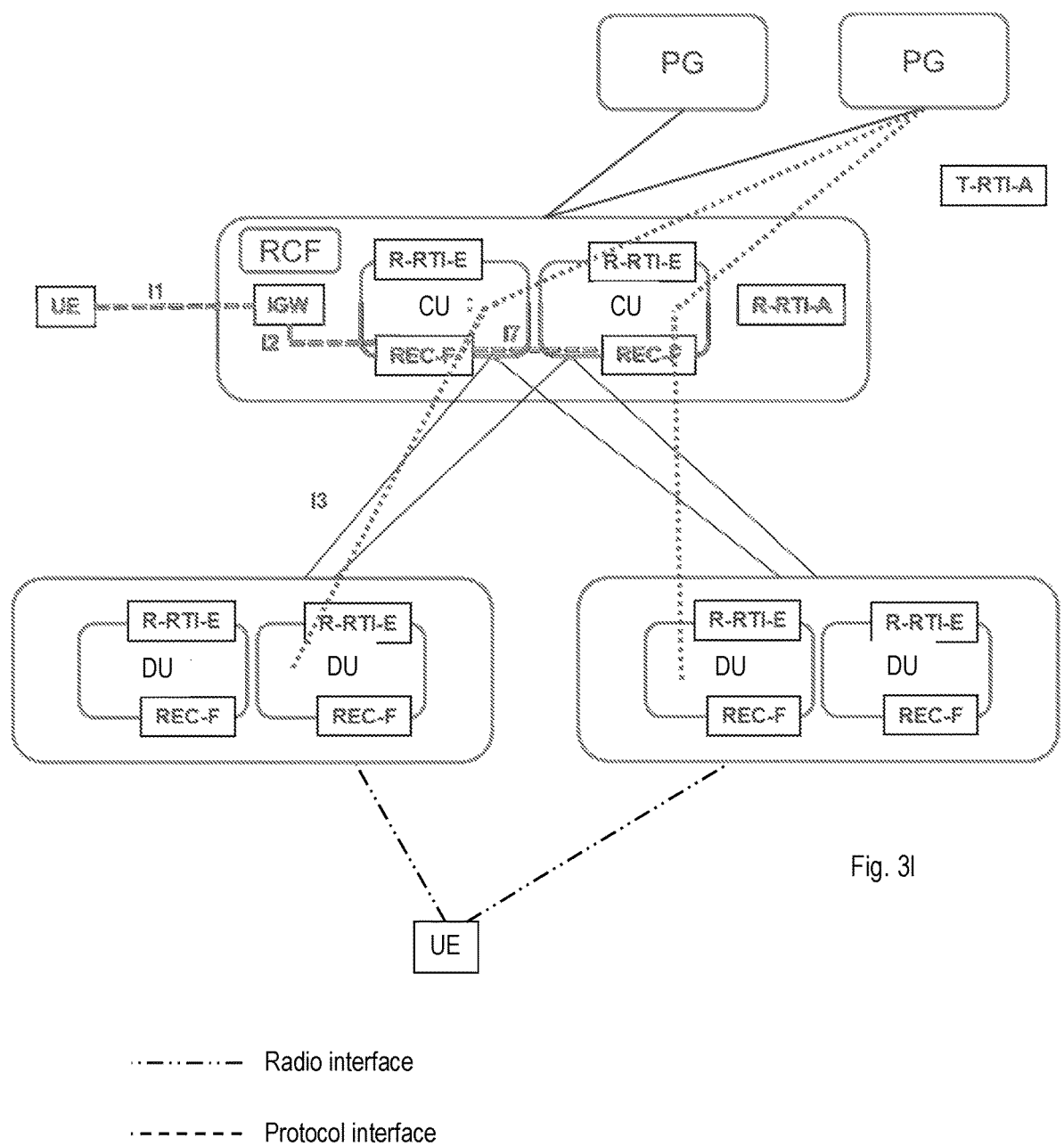

FIG. 3k is an exemplifying illustration of when dual connectivity is used in a split architecture, i.e. split RAN. In this dual connectivity example, the CU REC-F must collect information from the two applicable DU REC-F functions, and summarise the result from both of them. All other principles are the same.

Another variant of dual connectivity is when the dual connections are anchored at Core site instead. All principles are the same but in the case when the dual connectivity paths passes different CUs, then one CU is dual connectivity-master and the other is dual connectivity-slave. The dual connectivity-Slave REC-F sends Radio and Transport bandwidth information for its own path to dual connectivity-Master REC-F over I7 interface, see FIG. 3l.

Embodiments herein also relate to a network node for providing a recommendation associated with a service to a wireless device. The network node is operable in a wireless communication network. The network node has the same technical features, objects and advantages as the method performed by the network node described above. The network node will only be described in brief in order to avoid unnecessary repetition. Exemplifying embodiments of such a method will now be described with reference to FIGS. 4 and 5.

Figure 4:
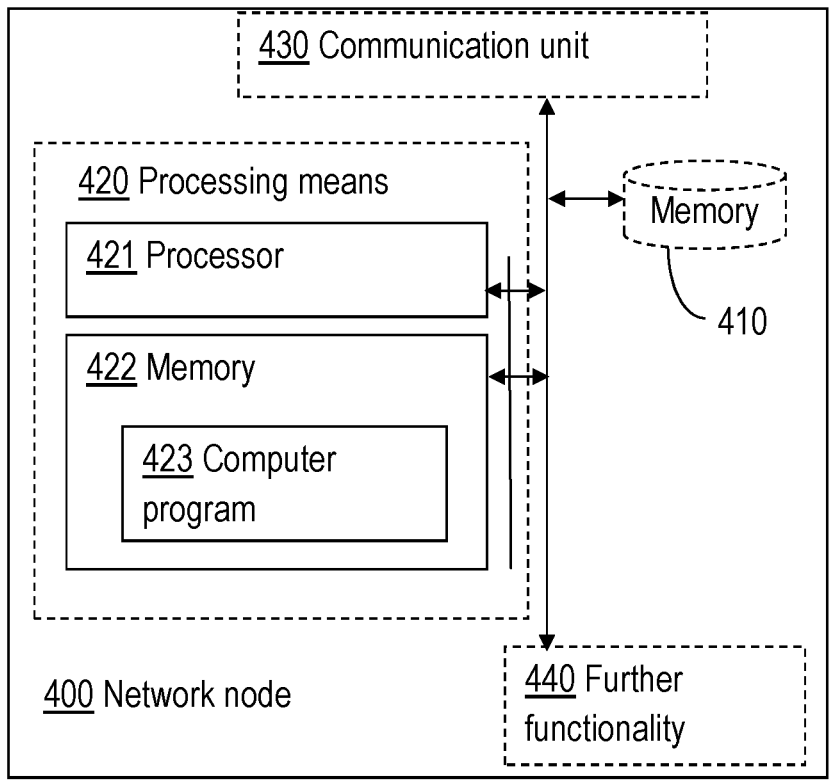
FIG. 4 is a block diagram of a network node for providing a recommendation associated with a service to a wireless device, according to an exemplifying embodiment.
Figure 5:
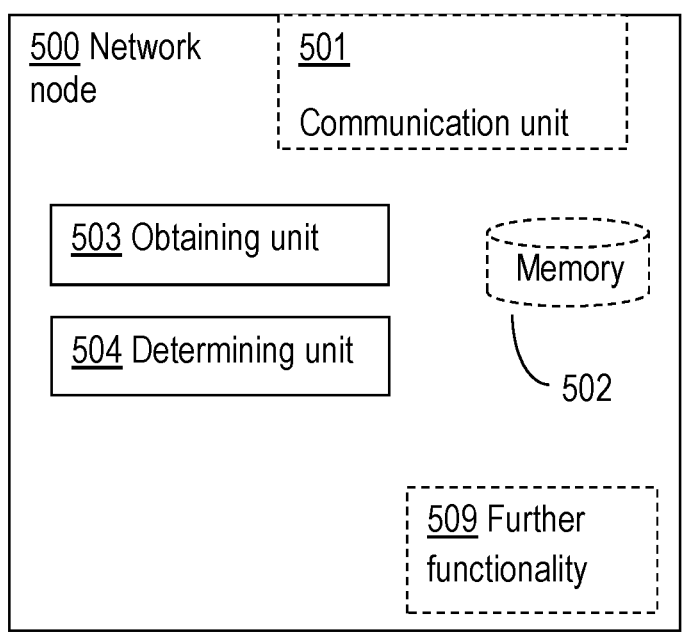
FIG. 5 is a block diagram of a network node for providing a recommendation associated with a service to a wireless device, according to another exemplifying embodiment.
Figure 6:
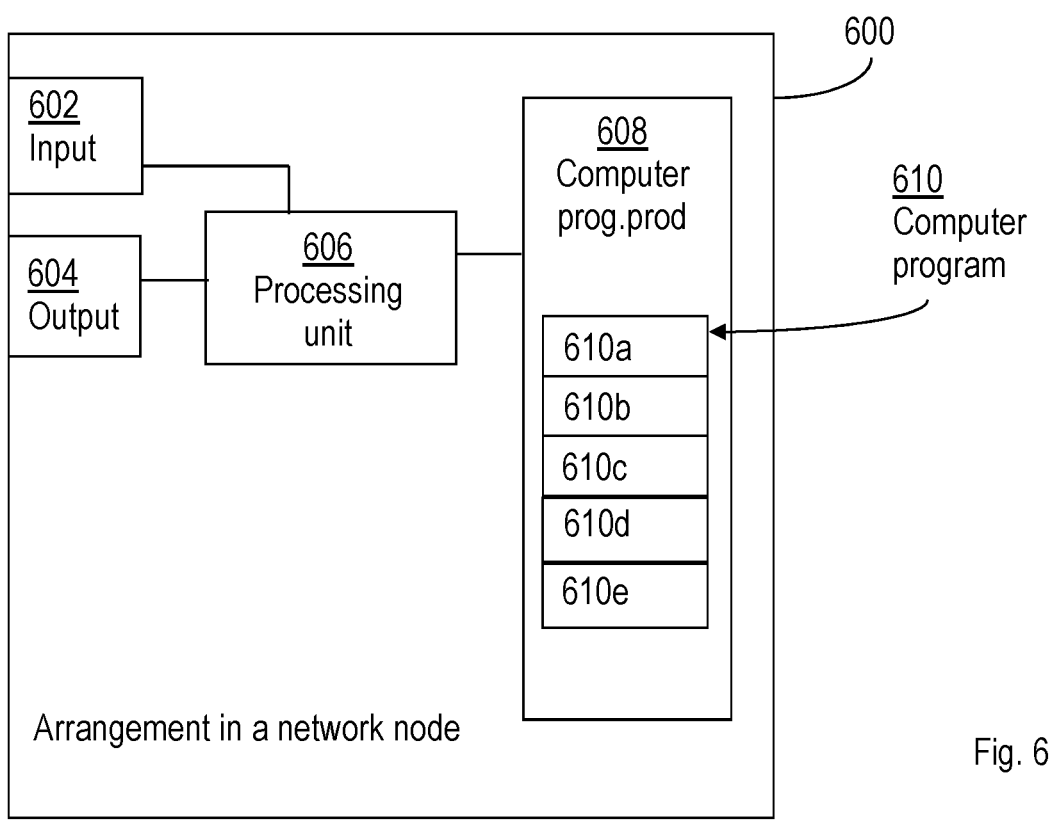
FIG. 6 is a block diagram of an arrangement in a network node for providing a recommendation associated with a service to a wireless device, according to an exemplifying embodiment.

FIGS. 4 and 5 illustrates the network node 400, 500 being configured for obtaining bandwidth information associated with a radio interface between a radio access node of a RAN of the wireless communication network and the wireless device; and obtaining bandwidth information associated with a transport network of the wireless communication network. The network node 400, 500 is further configured for determining available bandwidth for providing the service to the wireless device based on the obtained bandwidth information associated with the radio interface and the obtained bandwidth information associated with the transport network.

The network node 400, 500 may be implemented or realised in different ways. An exemplifying implementation is illustrated in FIG. 4. FIG. 4 illustrates the network node 400 comprising a processor 421 and memory 422, the memory comprising instructions, e.g. by means of a computer program 423, which when executed by the processor 421 causes the network node 400 to obtain bandwidth information associated with a radio interface between a radio access node of a RAN of the wireless communication network and the wireless device; and to obtain bandwidth information associated with a transport network of the wireless communication network. The memory 422 further comprises instructions, e.g. by means of a computer program 423, which when executed by the processor 421 causes the network node 400 to determine available bandwidth for providing the service to the wireless device based on the obtained bandwidth information associated with the radio interface and the obtained bandwidth information associated with the transport network.

FIG. 4 also illustrates the network node 400 comprising a memory 410. It shall be pointed out that FIG. 4 is merely an exemplifying illustration and memory 410 may optionally, be a part of the memory 422 or be a further memory of the network node 400 operable in the communication system. The memory may for example comprise information relating to the network node 400, to statistics of operation of the network node 400, just to give a couple of illustrating examples. FIG. 4 further illustrates the network node 400 comprising processing means 420, which comprises the memory 422 and the processor 421. Still further, FIG. 4 illustrates the network node 400 comprising a communication unit 430. The communication unit 430 may comprise an interface through which the network node 400 communicates with other nodes, servers, wireless devices or entities of the communication network. FIG. 4 also illustrates the network node 400 comprising further functionality 440. The further functionality 440 may comprise hardware of software necessary for the network node 400 to perform different tasks that are not disclosed herein.

An alternative exemplifying implementation of the network node 400, 500 is illustrated in FIG. 5. FIG. 5 illustrates the network node 500 comprising an obtaining unit 503 for obtaining bandwidth information associated with a radio interface between a radio access node of a RAN of the wireless communication network and the wireless device; and for obtaining bandwidth information associated with a transport network of the wireless communication network. FIG. 5 also illustrates the network node 500 comprising a determining unit 505 for determining available bandwidth for providing the service to the wireless device based on the obtained bandwidth information associated with the radio interface and the obtained bandwidth information associated with the transport network.

In FIG. 5, the network node 500 operable in a wireless communication system or network is also illustrated comprising a communication unit 501. Through this unit, the network node 500 is adapted to communicate with other nodes and/or entities in the wireless communication system. The communication unit 501 may comprise more than one receiving arrangement. For example, the communication unit may be connected to both a wire and an antenna, by means of which the network node 500 is enabled to communicate with other nodes and/or entities in the communication network. Similarly, the communication unit 501 may comprise more than one transmitting arrangement, which in turn are connected to both a wire and an antenna, by means of which the network node 500 is enabled to communicate with other nodes and/or entities in the wireless communication network. The network node 500 further comprises a memory 502 for storing data. Further, the network node 500 may comprise a control or processing unit (not shown) which in turn is connected to the different units 503-505. It shall be pointed out that this is merely an illustrative example and the network node 500 may comprise more, less or other units or modules which execute the functions of the network node 500 in the same manner as the units illustrated in FIG. 5.

It should be noted that FIG. 5 merely illustrates various functional units in the network node 500 in a logical sense. The functions in practice may be implemented using any suitable software and hardware means/circuits etc. Thus, the embodiments are generally not limited to the shown structures of the network node 500 and the functional units. Hence, the previously described exemplary embodiments may be realised in many ways. For example, one embodiment includes a computer-readable medium having instructions stored thereon that are executable by the control or processing unit for executing the method steps in the network node 500. The instructions executable by the computing system and stored on the computer-readable medium perform the method steps of the network node 500 as set forth in the claims.

The network node has the same possible advantages as the method performed by the network node. One possible advantage is that it may improve the end user Quality of Experience, QoE, by facilitating that for example a suitable media bit rate is used for video segments by using information about conditions in the radio interface as well as the transport network. In some embodiments, the solution also makes it possible to provide a suitable bandwidth recommendation associated with a service to the wireless device when the wireless device is served by multiple radio access node sites using carrier aggregation, CA, or dual connectivity, DC, by combining bandwidth information for the multiple radio interfaces and transport networks associated with the provision of the service to the wireless device. Furthermore, the interaction is between the wireless device and the wireless communication network via the radio access node, without involving/impacting the application service provider. There is thus only a relation between a subscriber's wireless device and the wireless communication network. There is no relation needed between the application service provider and the operator of the wireless communication network, which may be a big advantage since the number of application service providers compared to mobile operators is large.

According to an embodiment, the network node 400, 500 is further configured for determining a recommendation based on at least the determined available bandwidth, and providing the recommendation to the wireless device.

According to yet an embodiment, the network node is configured for determining the recommendation also based on information associated with the wireless device and/or the service.

According to still an embodiment, the information associated with the wireless device comprises one or more of (a) priority of the wireless device, and (b) capabilities of the wireless device.

According to a further embodiment, the information associated with the service comprise one or more of (i) type of service, (ii) latency requirements, (iii), client buffer level status, and (iv) deadline of delivery of service.

According to another embodiment, the transport network comprises a part of the wireless communication network between the radio access node and either an application server within the wireless communication network providing the service or a gateway of the wireless communication network towards a second communication network.

According to an embodiment, the radio access node comprises a first unit of the RAN and communicates with the application server or the gateway via at least a second unit of the RAN.

According to yet an embodiment, the wireless communication network supports dual connectivity, wherein the network node is configured for obtaining bandwidth information associated with the radio interface by obtaining respective bandwidth information associated with respective radio interface for each radio access node the wireless device is associated with, and for obtaining bandwidth information associated with the transport network by obtaining respective bandwidth information associated with transport network for each radio access node the wireless device is associated with.

According to still an embodiment, the determining of available bandwidth for providing the service to the wireless device is based on the obtained bandwidth information associated with the radio interface for each radio access node the wireless device is associated with and the obtained bandwidth information associated with the transport network for each radio access node the wireless device is associated with.

While the embodiments have been described in terms of several embodiments, it is contemplated that alternatives, modifications, permutations and equivalents thereof will become apparent upon reading of the specifications and study of the drawings. It is therefore intended that the following appended claims include such alternatives, modifications, permutations and equivalents as fall within the scope of the embodiments and defined by the pending claims.

The invention claimed is:

1. A method performed by a network node for providing a recommendation associated with a service provided to a wireless device, the network node being operable in a wireless communication network, the wireless communication network providing the service to the wireless device, the method comprising:
   obtaining bandwidth information associated with a radio interface between a radio access node of a Radio Access Network, RAN, of the wireless communication network and the wireless device;
   obtaining bandwidth information associated with a transport network, the transport network comprising a part of the wireless communication network between the radio access node and one of an application server within the wireless communication network providing the service and a gateway of the wireless communication network towards a second communication network; and
   determining available bandwidth for providing the service to the wireless device based on the obtained bandwidth information associated with the radio interface and the obtained bandwidth information associated with the transport network.

2. The method according to claim 1, further comprising determining the recommendation based on at least the determined available bandwidth, and providing the recommendation to the wireless device.

3. The method according to claim 2, wherein the determining of the recommendation is also based on information associated with at least one of the wireless device and the service.

4. The method according to claim 3, wherein the information associated with the wireless device comprise one or more of (a) priority of the wireless device, and (b) capabilities of the wireless device.

5. The method according to claim 4, wherein the information associated with the service comprise one or more of (i) type of service, (ii) latency requirements, (iii), client buffer level status, and (iv) deadline of delivery of service.

6. The method according to claim 3, wherein the information associated with the service comprise one or more of (i) type of service, (ii) latency requirements, (iii), client buffer level status, and (iv) deadline of delivery of service.

7. The method according to claim 1, wherein the radio access node comprises a first unit of the RAN and communicates with the one of the application server and the gateway via at least a second unit of the RAN.

8. The method according to claim 1, wherein the wireless communication network supports dual connectivity, wherein the obtaining of bandwidth information associated with the radio interface comprises obtaining respective bandwidth information associated with respective radio interface for each radio access node the wireless device is associated with, and wherein the obtaining of bandwidth information associated with the transport network comprises obtaining respective bandwidth information associated with transport network for each radio access node the wireless device is associated with.

9. The method according to claim 8, wherein the determining of available bandwidth for providing the service to the wireless device is based on the obtained bandwidth information associated with the radio interface for each radio access node the wireless device is associated with and the obtained bandwidth information associated with the transport network for each radio access node the wireless device is associated with.

10. A network node for providing a recommendation associated with a service provided to a wireless device, the network node being configured for operation in a wireless communication network, the wireless communication network providing the service to the wireless device, the network node being configured to:
  obtain bandwidth information associated with a radio interface between a radio access node of a Radio Access Network, RAN, of the wireless communication network and the wireless device;
  obtain bandwidth information associated with a transport network, the transport network comprising a part of the wireless communication network between the radio access node and one of an application server within the wireless communication network providing the service and a gateway of the wireless communication network towards a second communication network; and
  determine available bandwidth for providing the service to the wireless device based on the obtained bandwidth information associated with the radio interface and the obtained bandwidth information associated with the transport network.

11. The network node according to claim 10, further being configured to determine the recommendation based on at least the determined available bandwidth, and provide the recommendation to the wireless device.

12. The network node according to claim 11, wherein determining the recommendation is also based on information associated with at least one of the wireless device and the service.

13. The network node according to claim 12, wherein the information associated with the wireless device comprise one or more of (a) priority of the wireless device, and (b) capabilities of the wireless device.

14. The network node according to claim 12, wherein the information associated with the service comprise one or more of (i) type of service, (ii) latency requirements, (iii), client buffer level status, and (iv) deadline of delivery of service.

15. The network node according to claim 10, wherein the radio access node comprises a first unit of the RAN and communicates with the one of the application server and the gateway via at least a second unit of the RAN.

16. The network node according to claim 10, wherein the wireless communication network supports dual connectivity, wherein the network node is configured for obtaining bandwidth information associated with the radio interface by obtaining respective bandwidth information associated with respective radio interface for each radio access node the wireless device is associated with, and for obtaining information associated with transport network for each radio access node the wireless device is associated with.

17. The network node according to claim 16, wherein the determining of available bandwidth for providing the service to the wireless device is based on the obtained bandwidth information associated with the radio interface for each radio access node the wireless device is associated with and the obtained bandwidth information associated with the transport network for each radio access node the wireless device is associated with.

18. A non-transitory computer storage medium storing an executable computer program which, when run in a processing unit in a network node for providing a recommendation associated with a service provided to a wireless device, the network node being operable in a wireless communication network providing the service to the wireless device, causes the network node to perform a method comprising:
  obtaining bandwidth information associated with a radio interface between a radio access node of a Radio Access Network, RAN, of the wireless communication network and the wireless device;
  obtaining bandwidth information associated with a transport network, the transport network comprising a part of the wireless communication network between the radio access node and one of an application server within the wireless communication network providing the service and a gateway of the wireless communication network towards a second communication network; and
  determining available bandwidth for providing the service to the wireless device based on the obtained bandwidth information associated with the radio interface and the obtained bandwidth information associated with the transport network.

* * * * *